(12) United States Patent
Rosenblum et al.

(10) Patent No.: US 10,274,598 B2
(45) Date of Patent: *Apr. 30, 2019

(54) NAVIGATION BASED ON RADAR-CUED VISUAL IMAGING

(71) Applicant: MOBILEYE VISION TECHNOLOGIES LTD., Jerusalem (IL)

(72) Inventors: Kevin Rosenblum, Jerusalem (IL); Erez Dagan, Tel Aviv (IL)

(73) Assignee: MOBILEYE VISION TECHNOLOGIES LTD., Jerusalem (IL)

(*) Notice: Subject to any disclaimer, the term of this patent is extended or adjusted under 35 U.S.C. 154(b) by 52 days.

This patent is subject to a terminal disclaimer.

(21) Appl. No.: 15/597,148

(22) Filed: May 16, 2017

(65) Prior Publication Data

US 2017/0248694 A1 Aug. 31, 2017

Related U.S. Application Data

(63) Continuation of application No. 14/627,178, filed on Feb. 20, 2015, now Pat. No. 9,664,789.

(Continued)

(51) Int. Cl.
*G06K 9/00* (2006.01)
*G06T 7/00* (2017.01)
(Continued)

(52) U.S. Cl.
CPC ............ *G01S 13/931* (2013.01); *G01S 13/86* (2013.01); *G01S 13/867* (2013.01);
(Continued)

(58) Field of Classification Search
CPC ....... G01S 13/867; G01S 13/931; G06T 7/00; G06T 7/11; G06T 7/12; G06T 7/13; G06T 7/20; G06T 7/215
See application file for complete search history.

(56) References Cited

U.S. PATENT DOCUMENTS 4,257,703 A * 3/1981 Goodrich ............... G01S 11/12
340/436
5,515,448 A * 5/1996 Nishitani ............... B60Q 9/008
340/435

(Continued)

FOREIGN PATENT DOCUMENTS

CN 102414715 A 4/2012
CN 102428385 A 4/2012

(Continued)

OTHER PUBLICATIONS

International Search Report and Written Opinion dated Sep. 16, 2015, received in corresponding International Application No. PCT/IB2015/000673, filed Feb. 20, 2015 (13 pages).

(Continued)

*Primary Examiner* — Peter M Bythrow
(74) *Attorney, Agent, or Firm* — Finnegan, Henderson, Farabow, Garrett & Dunner, LLP

(57) ABSTRACT

A navigation system for a vehicle may include at least one image capture device configured to acquire a plurality of images of an environment of a vehicle and a radar sensor to detect an object in the environment of the vehicle and to provide and output including range information indicative of at least one of a range or range rate between the vehicle and the object. The system may also include at least one processing device programmed to: receive the plurality of images from the at least one image capture device; receive the output from the radar sensor; determine, for each of a plurality of image segments in a first image, from among the plurality of images, and corresponding image segments in a second image, from among the plurality of images, an indicator of optical flow; use range information determined based on the output of the radar sensor together with the indicators of optical flow determined for each of the plurality of image segments in the first image and the corresponding (Continued)

ing image segments in the second image to calculate for each of a plurality of imaged regions at least one value indicative of a focus of expansion; identify a target object region, including at least a subset of the plurality of imaged regions that share a substantially similar focus of expansion; and cause a system response based on the identified target object region.

28 Claims, 30 Drawing Sheets

Related U.S. Application Data

(60) Provisional application No. 61/942,088, filed on Feb. 20, 2014.

(51) Int. Cl.
   *G01S 13/42*     (2006.01)
   *G01S 13/86*     (2006.01)
   *G01S 13/87*     (2006.01)
   *G01S 13/93*     (2006.01)
   *G06T 7/215*     (2017.01)

(52) U.S. Cl.
   CPC .......... *G06K 9/00791* (2013.01); *G06T 7/215* (2017.01); *G01S 13/426* (2013.01); *G01S 13/87* (2013.01); *G01S 2013/935* (2013.01); *G01S 2013/9342* (2013.01); *G01S 2013/9346* (2013.01); *G01S 2013/9357* (2013.01); *G01S 2013/9382* (2013.01); *G06T 7/00* (2013.01); *G06T 2207/30261* (2013.01)

(56) References Cited

U.S. PATENT DOCUMENTS

| | | | | |
|---|---|---|---|---|
| 5,638,116 | A * | 6/1997 | Shimoura | G05D 1/0246 348/118 |
| 6,246,961 | B1 * | 6/2001 | Sasaki | G08G 1/166 701/117 |
| 7,266,220 | B2 * | 9/2007 | Sato | G06K 9/00805 340/937 |
| 7,711,147 | B2 * | 5/2010 | Koike | G06T 7/269 382/103 |
| 8,082,101 | B2 * | 12/2011 | Stein | G08G 1/16 701/301 |
| 8,164,628 | B2 * | 4/2012 | Stein | G01C 3/22 348/148 |
| 8,452,055 | B2 | 5/2013 | Stein et al. | |
| 8,812,226 | B2 * | 8/2014 | Zeng | G01S 13/723 382/103 |
| 8,861,792 | B2 | 10/2014 | Stein et al. | |
| 8,879,795 | B2 | 11/2014 | Stein et al. | |
| 9,436,880 | B2 * | 9/2016 | Bos | B60N 2/002 |
| 9,664,789 | B2 * | 5/2017 | Rosenblum | G01S 13/931 |
| 2001/0016797 | A1 * | 8/2001 | Ogura | G06T 7/246 701/301 |
| 2003/0002713 | A1 | 1/2003 | Chen | |
| 2003/0210807 | A1 * | 11/2003 | Sato | G06K 9/00805 382/104 |
| 2003/0214576 | A1 * | 11/2003 | Koga | B60R 1/00 348/47 |
| 2004/0057600 | A1 * | 3/2004 | Niwa | B60R 25/104 382/103 |
| 2006/0171563 | A1 * | 8/2006 | Takashima | G01C 21/28 382/104 |
| 2007/0055446 | A1 * | 3/2007 | Schiffmann | G01S 7/4026 701/301 |
| 2009/0252377 | A1 * | 10/2009 | Akita | G06K 9/3241 382/106 |
| 2010/0007728 | A1 | 1/2010 | Strauss et al. | |
| 2010/0172542 | A1 * | 7/2010 | Stein | G06K 9/00798 382/103 |
| 2010/0191391 | A1 * | 7/2010 | Zeng | G01S 13/723 701/1 |
| 2010/0225522 | A1 * | 9/2010 | DeMersseman | G01S 7/03 342/72 |
| 2010/0305857 | A1 * | 12/2010 | Byrne | G06T 7/73 701/301 |
| 2011/0037853 | A1 * | 2/2011 | Shiraishi | G01S 13/931 348/148 |
| 2011/0184617 | A1 * | 7/2011 | Hegemann | B60T 7/22 701/70 |
| 2012/0027258 | A1 * | 2/2012 | Uchida | G06K 9/00805 382/103 |
| 2012/0106786 | A1 * | 5/2012 | Shiraishi | G01S 17/936 382/103 |
| 2012/0133769 | A1 * | 5/2012 | Nagamine | B60R 1/00 348/148 |
| 2012/0140061 | A1 * | 6/2012 | Zeng | G01S 13/726 348/135 |
| 2012/0140076 | A1 * | 6/2012 | Rosenbaum | G06K 9/00805 348/148 |
| 2012/0182426 | A1 * | 7/2012 | Fukuda | G06T 7/0042 348/148 |
| 2012/0308114 | A1 * | 12/2012 | Othmezouri | G05D 1/0251 382/154 |
| 2012/0314071 | A1 * | 12/2012 | Rosenbaum | B60W 30/0956 348/148 |
| 2013/0088343 | A1 * | 4/2013 | Deigmoller | G06T 7/2006 340/436 |
| 2013/0253796 | A1 * | 9/2013 | Luo | G08G 1/166 701/96 |
| 2013/0308828 | A1 | 11/2013 | Stein et al. | |
| 2014/0037138 | A1 * | 2/2014 | Sato | G08G 1/166 382/103 |
| 2014/0139369 | A1 * | 5/2014 | Baba | G01S 13/867 342/146 |
| 2014/0236471 | A1 | 8/2014 | Stein et al. | |
| 2015/0063648 | A1 * | 3/2015 | Minemura | G06K 9/6217 382/104 |
| 2015/0066348 | A1 * | 3/2015 | Baba | G08G 1/166 701/301 |
| 2015/0146930 | A1 * | 5/2015 | Nakano | G06K 9/00993 382/104 |
| 2015/0294453 | A1 * | 10/2015 | Nakano | G06T 7/20 348/135 |
| 2016/0123757 | A1 * | 5/2016 | Backstrom | G06T 11/60 701/523 |

FOREIGN PATENT DOCUMENTS

| | | |
|---|---|---|
| DE | 10 2007 04951 | 4/2008 |
| DE | 10 2007 04970 | 4/2009 |
| JP | 2013-020507 | 1/2013 |

OTHER PUBLICATIONS

Amir Sole et al., "Solid or Not Solid: Vision for Radar Target Validation," IV Conference, 2004, 6 pages.

The First Office Action issued by the State Intellectual Property Office of the People's Republic of China dated May 8, 2018 in Counterpart Chinese Application No. 201580018932.1 and its English Translation Thereof.

* cited by examiner

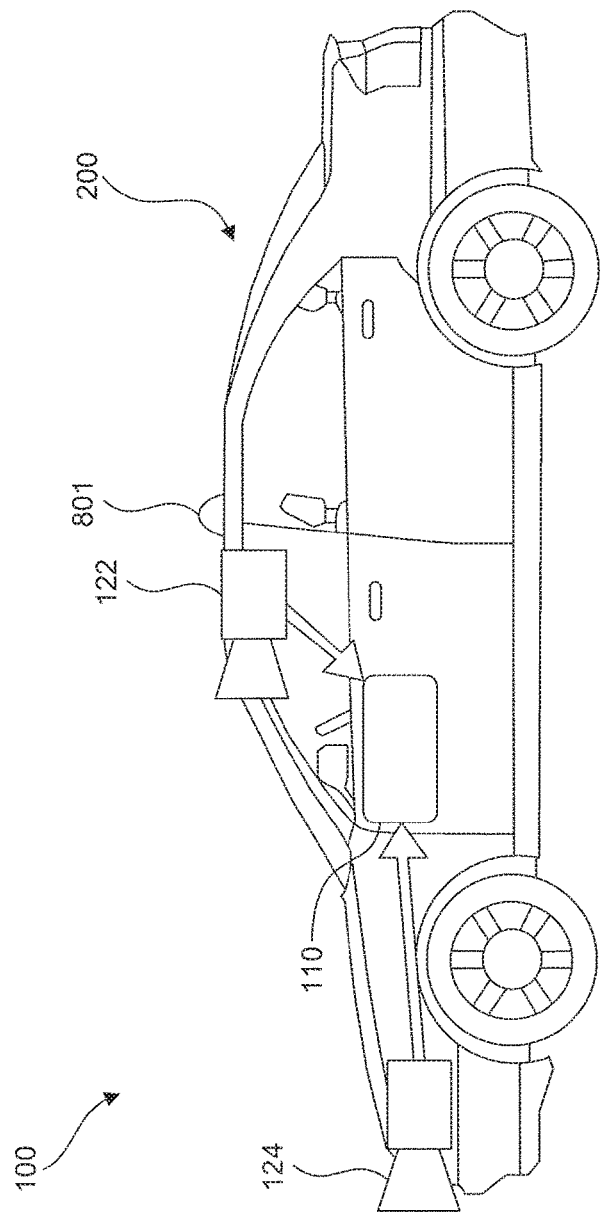

NAVIGATION BASED ON RADAR-CUED VISUAL IMAGING

CROSS REFERENCE TO RELATED APPLICATION

This application is a continuation application of U.S. application Ser. No. 14/627,178, filed Feb. 20, 2015 (now U.S. Pat. No. 9,664,789), which claims the benefit of priority of U.S. Provisional Patent Application No. 61/942,088, filed on Feb. 20, 2014. The foregoing applications are incorporated herein by reference in their entirety.

BACKGROUND

I. Technical Field

The present disclosure relates generally to vehicle navigation and, more specifically, to systems and methods that fuse radar and visual information to navigate relative to detected objects.

II. Background Information

Various sensors may be employed, whether in a driver assist system or an autonomous vehicle, in order to aid in navigation of the vehicle. Such sensors may include radar units and cameras, among others. These sensors may collect information from the environment of a vehicle and use the collected information to make navigational decisions relative to various objects, hazards, etc. present in the environment of the vehicle. For example, the sensors may collect information associated with objects in a roadway, other vehicles, light poles, guard rails, pedestrians, among others. Information collected from the onboard sensor systems may enable driver assist or autonomous driving systems to recognize objects in a vehicle's environment and take appropriate action to reduce or minimize the risk of collisions.

SUMMARY

Embodiments consistent with the present disclosure provide systems and methods for autonomous vehicle navigation. The disclosed embodiments may use cameras and/or radar to provide autonomous vehicle navigation features.

Consistent with a disclosed embodiment, a navigation system for a vehicle may include at least one image capture device configured to acquire a plurality of images of an environment of a vehicle and a radar sensor to detect an object in the environment of the vehicle and to provide and output indicative of a range and/or range rate between the vehicle and the object. The system may also include at least one processing device programmed to: receive the plurality of images from the at least one image capture device; receive the output from the radar sensor; determine, for each of a plurality of image segments in a first image, from among the plurality of images, and corresponding image segments in a second image, from among the plurality of images, an indicator of optical flow; determine a value indicative of an expected optical inflation associated with the object in the plurality of images based at least upon range and/or range rate information determined from the output of the radar sensor; determine one or more areas of the second image where the value indicative of an expected optical inflation associated with the object substantially matches the indicator of optical flow; identify a target object region, including at least a subset of the determined one or more areas of the second image; and cause a system response based on the identified target object region.

The disclosed embodiments may also include a vehicle comprising a navigation system. The navigation system may include at least one image capture device configured to acquire a plurality of images of an environment of a vehicle and a radar sensor to detect an object in the environment of the vehicle and to provide and output indicative of a range and/or range rate between the vehicle and the object. The system may also include at least one processing device programmed to: receive the plurality of images from the at least one image capture device; receive the output from the radar sensor; determine, for each of a plurality of image segments in a first image, from among the plurality of images, and corresponding image segments in a second image, from among the plurality of images, an indicator of optical flow; determine a value indicative of an expected optical inflation associated with the object in the plurality of images based at least upon range and/or range rate information determined from the output of the radar sensor; determine one or more areas of the second image where the value indicative of an expected optical inflation associated with the object substantially matches the indicator of optical flow; identify a target object region, including at least a subset of the determined one or more areas of the second image; and cause a system response based on the identified target object region.

The disclosed embodiments may also include a method for navigating a vehicle based on radar detection and visual image data. The method may include acquiring a plurality of images of an environment of the vehicle; detecting an object in the environment of the vehicle using a radar sensor and providing an output of the radar sensor indicative of a range and/or range rate between the object and the vehicle; receiving at one or more processing devices the plurality of images from the at least one image capture device and the output from the radar sensor; determining an indicator of optical flow, for each of a plurality of image segments in a first image, from among the plurality of images, and corresponding image segments in a second image, from among the plurality of images; identifying a target object region having a substantially common focus of expansion, based on range information provided by the radar sensor and the determined indicators of optical flow; and causing a system response based on the identified target object region.

The disclosed embodiments may include a navigation system for a vehicle. The system may include at least one image capture device configured to acquire a plurality of images of an environment of a vehicle; a radar sensor to detect an object in the environment of the vehicle and to provide and output indicative of a range and/or range rate between the vehicle and the object; and at least one processing device. The at least one processing device may be programmed to receive the plurality of images from the at least one image capture device; receive the output from the radar sensor; determine, for each of a plurality of image segments in a first image, from among the plurality of images, and corresponding image segments in a second image, from among the plurality of images, an indicator of optical flow; identify a target object region having a substantially common focus of expansion, based on range and/or range rate information provided by the radar sensor and the determined indicators of optical flow; and cause a system response based on the identified target object region.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 9A is a diagrammatic side view representation of an exemplary vehicle including a system consistent with the disclosed embodiments.

DETAILED DESCRIPTION

Figure 1:
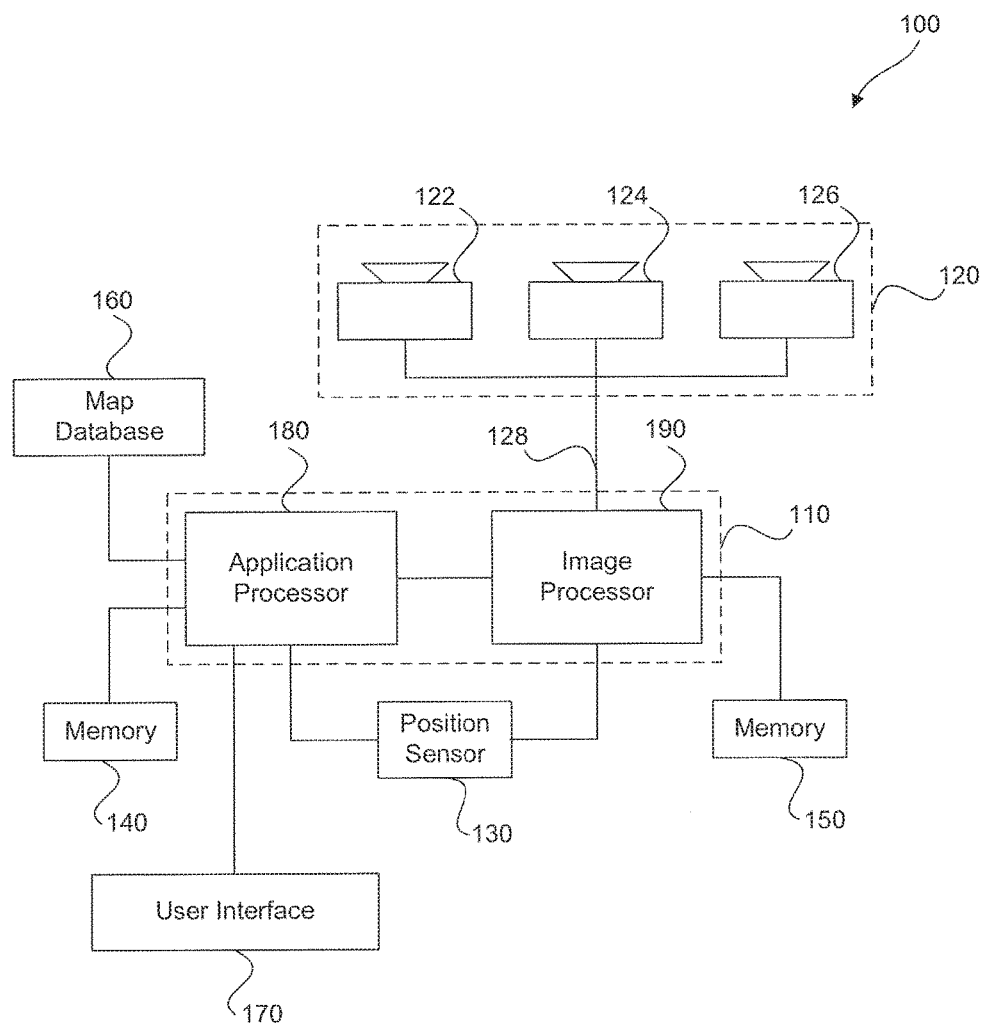
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, and a user interface 170. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
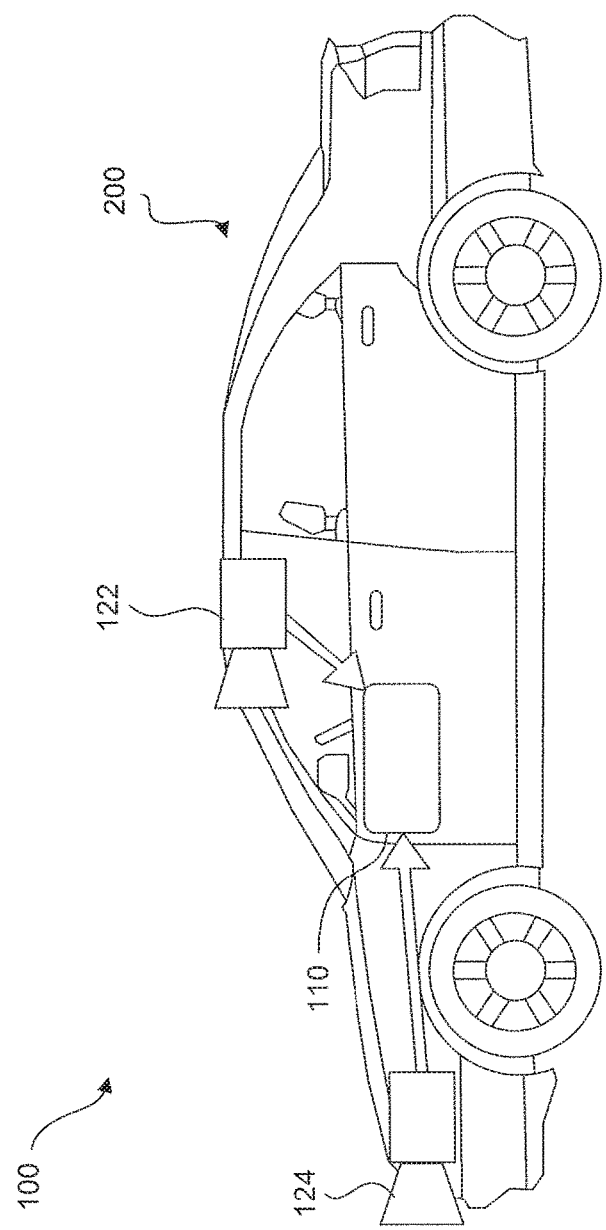
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
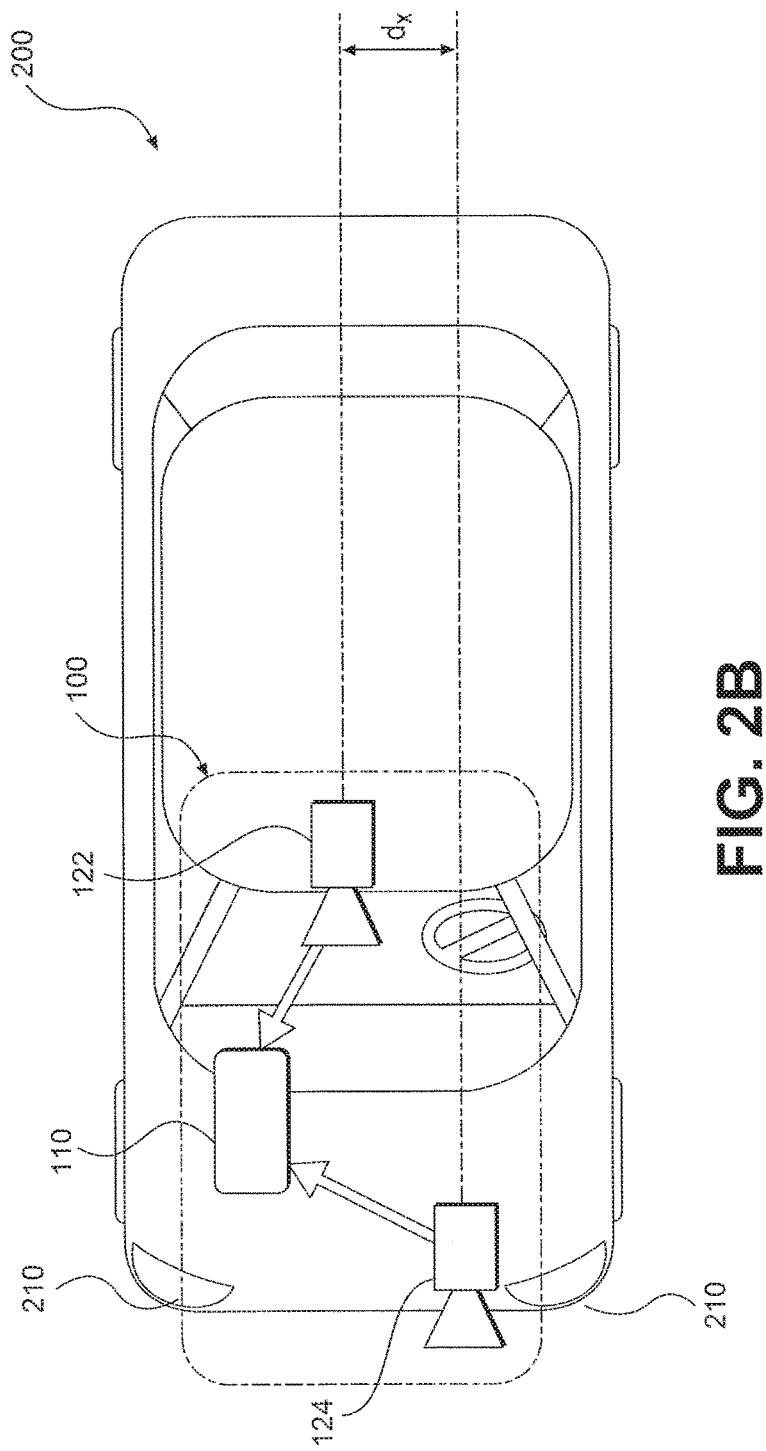
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
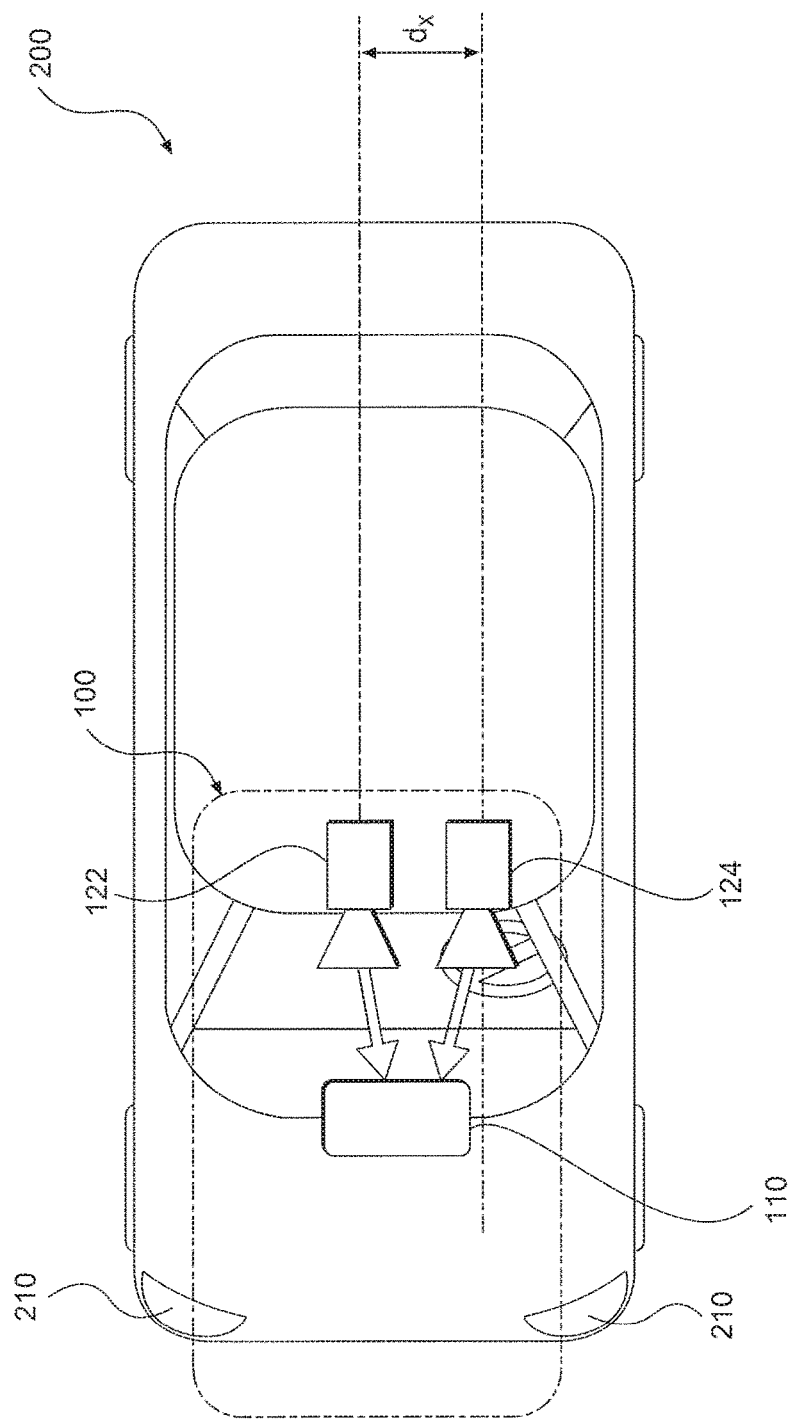
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
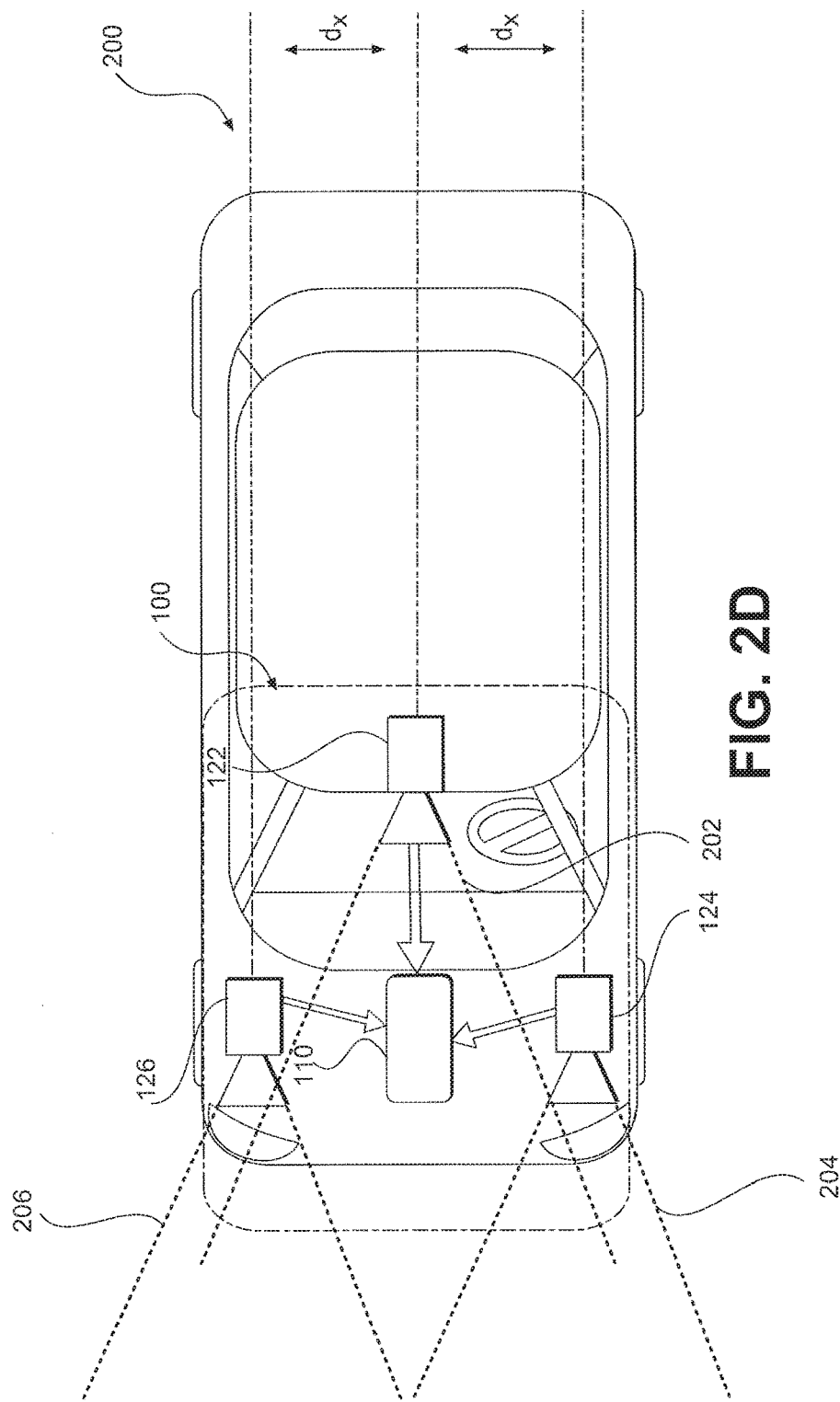
FIG. 2D is a diagrammatic top view representation of yet another embodiment of a vehicle including a system consistent with the disclosed embodiments.
Figure 2E:
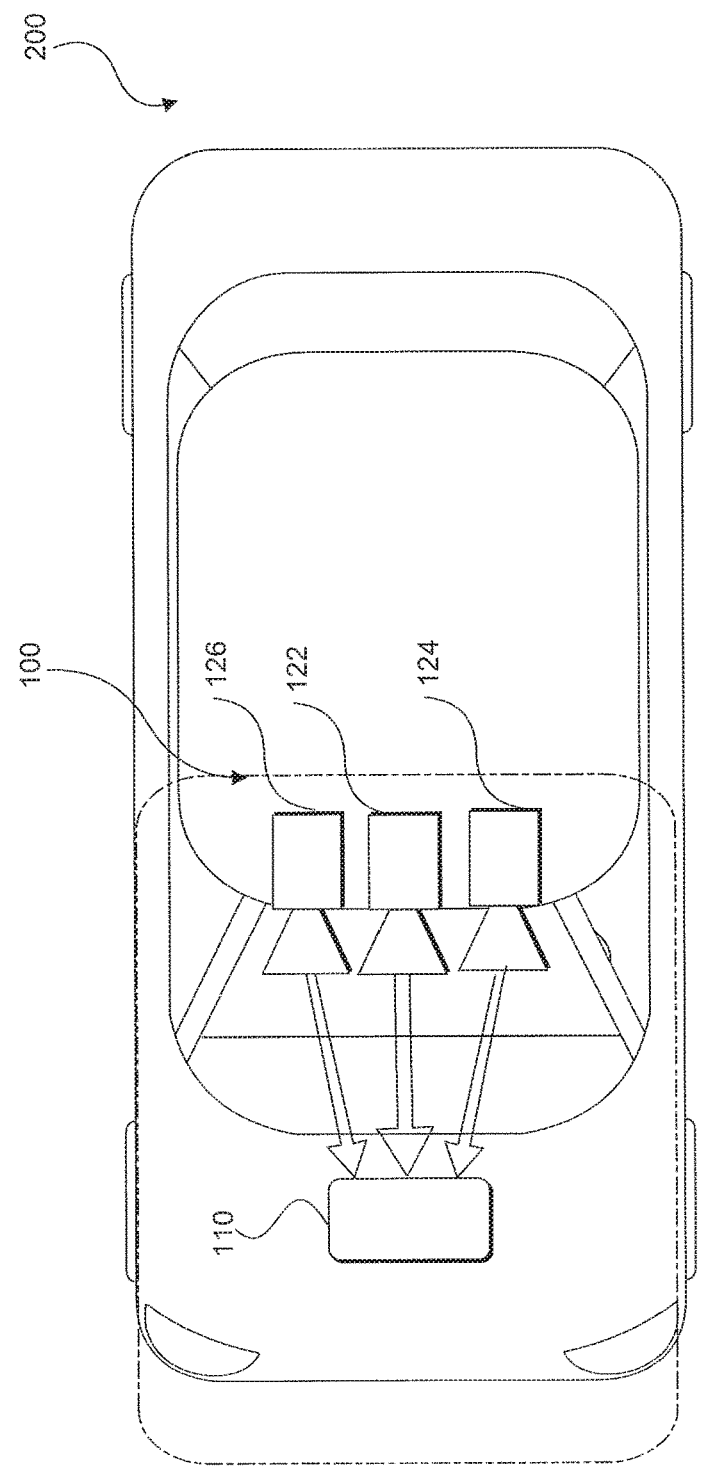
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
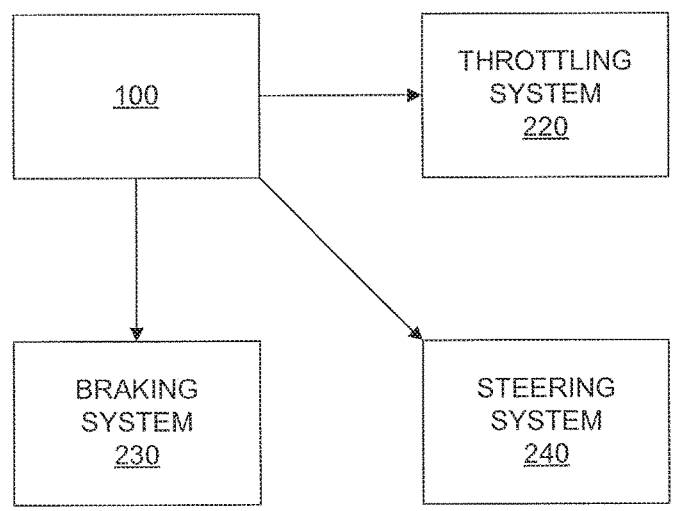
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
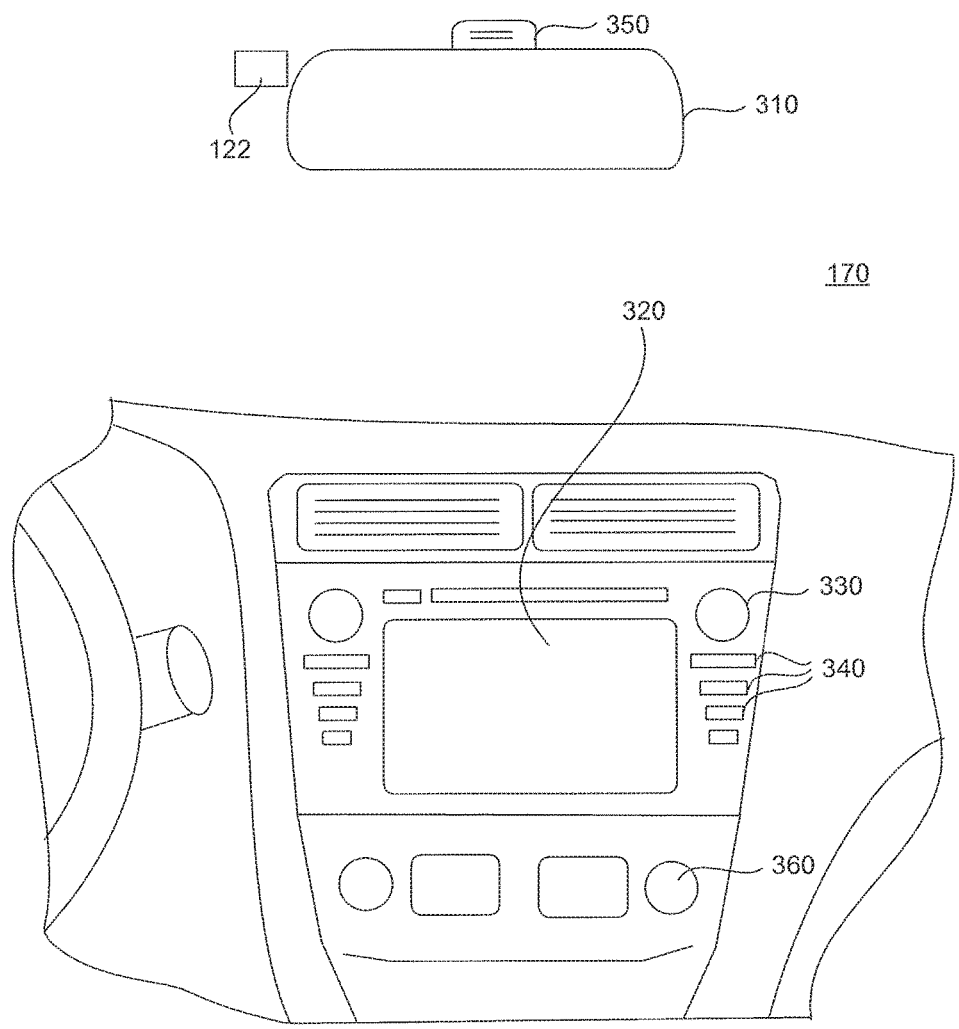
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
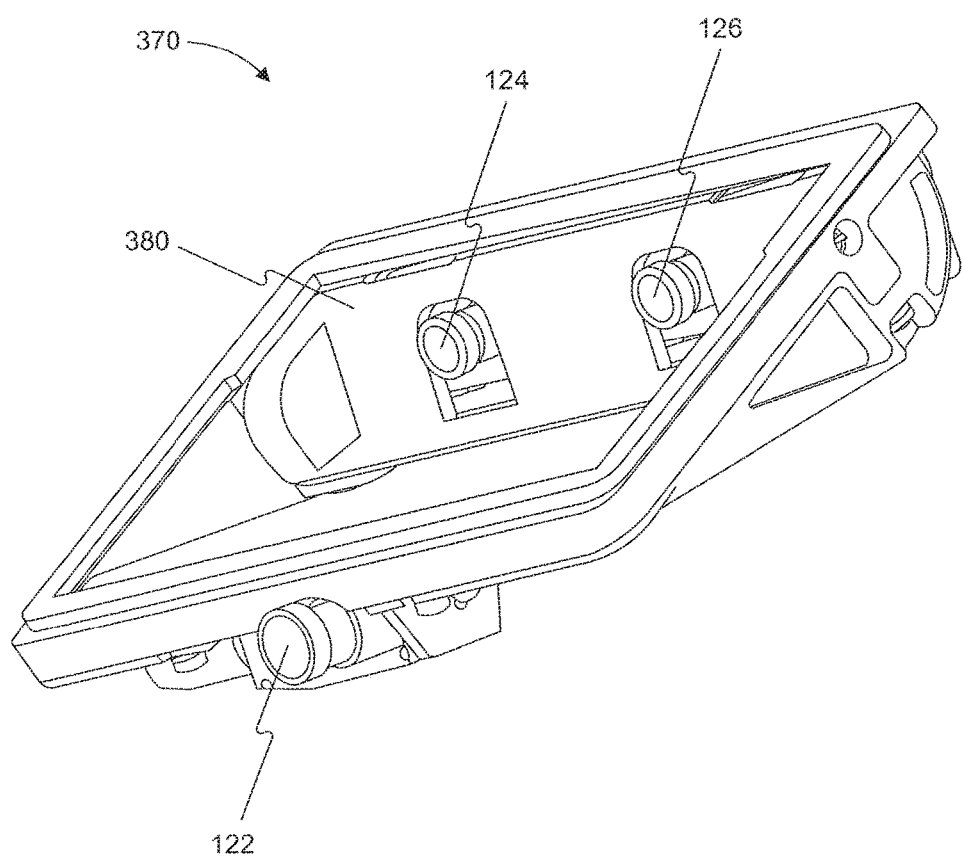
FIG. 3B is an illustration of an example of a camera mount that is configured to be positioned behind a rearview mirror and against a vehicle windshield consistent with the disclosed embodiments.
Figure 3C:
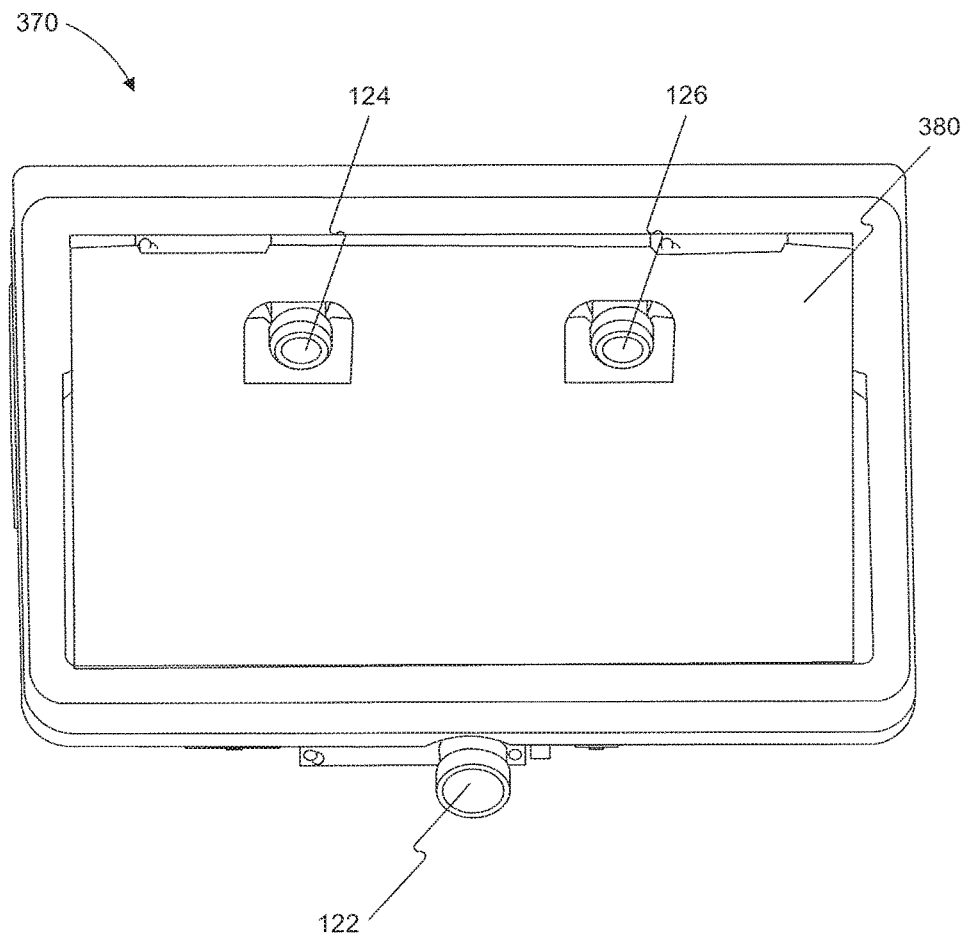
FIG. 3C is an illustration of the camera mount shown in FIG. 3B from a different perspective consistent with the disclosed embodiments.
Figure 3D:
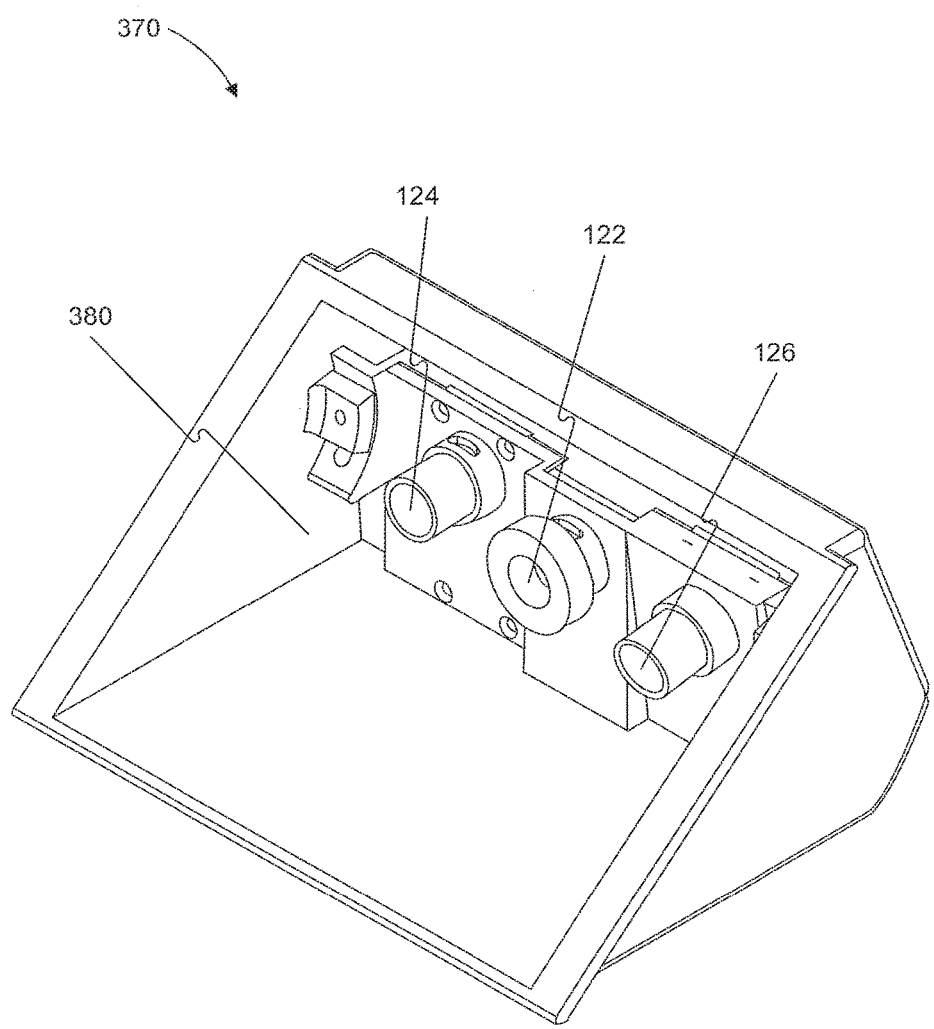
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
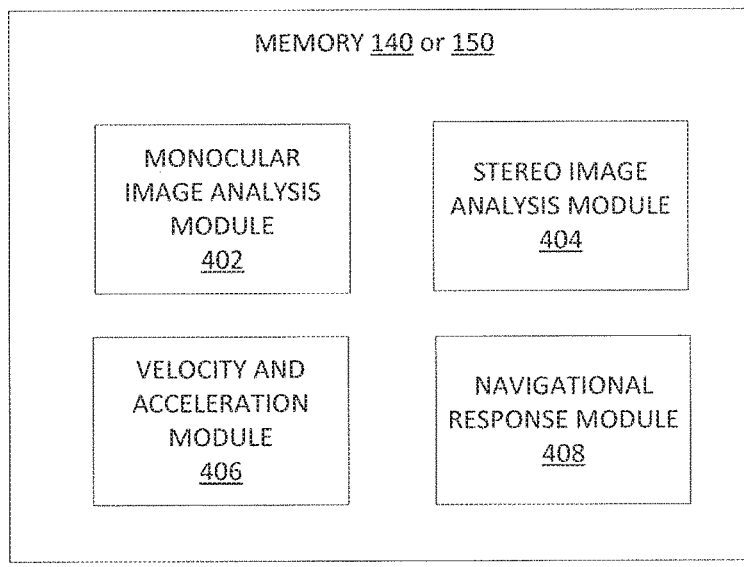
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
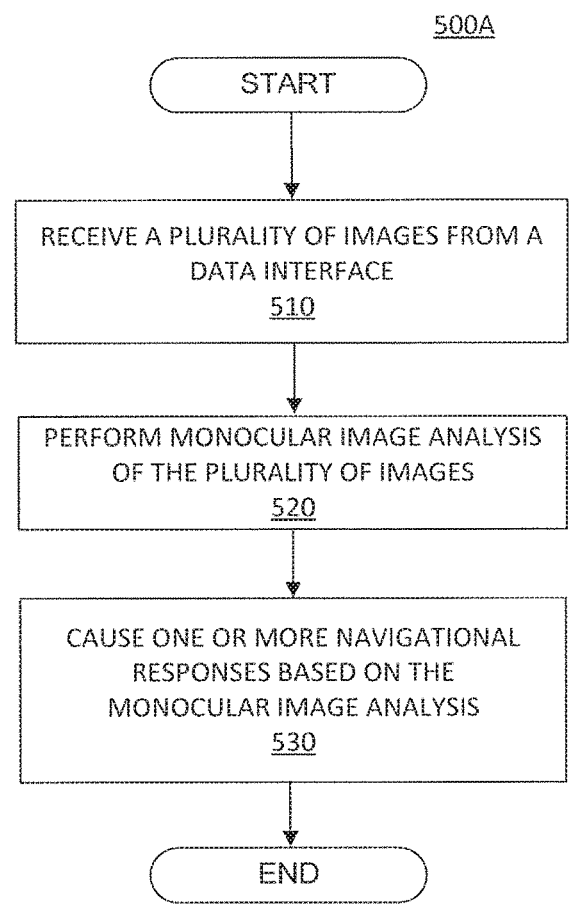
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
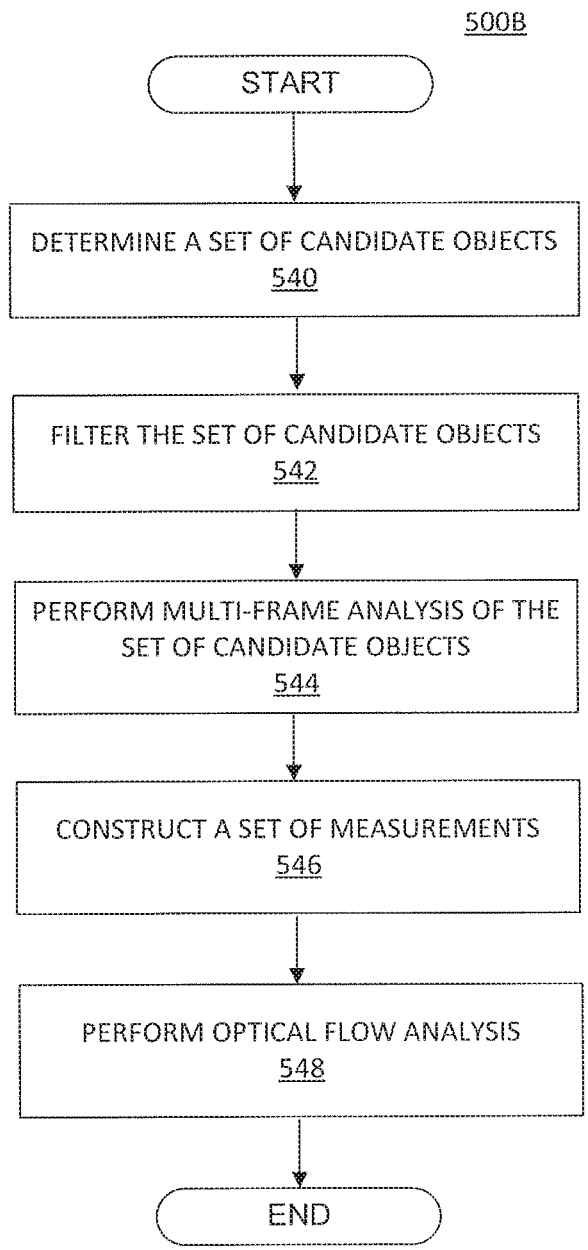
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
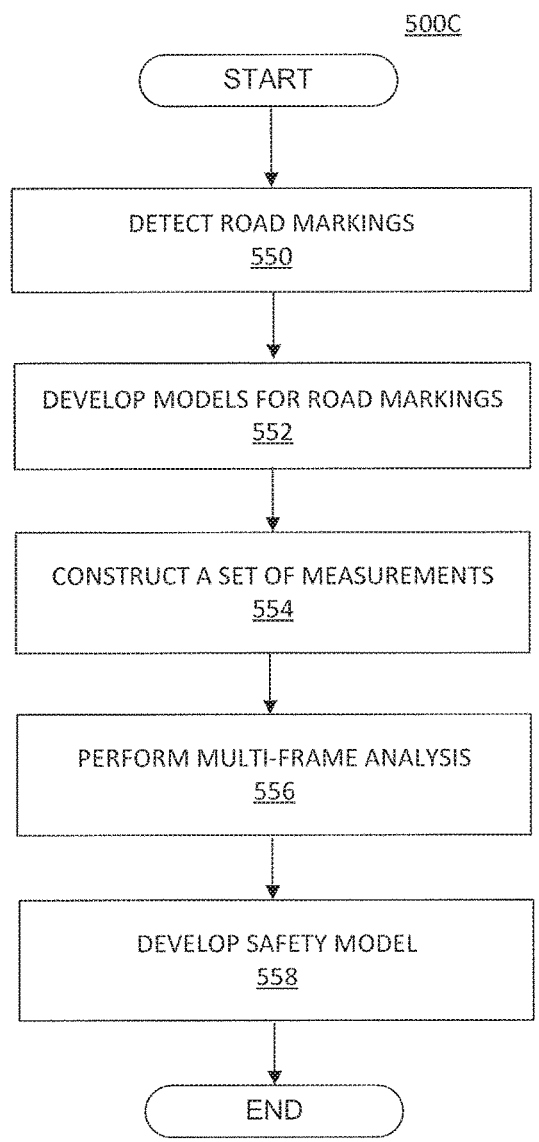
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
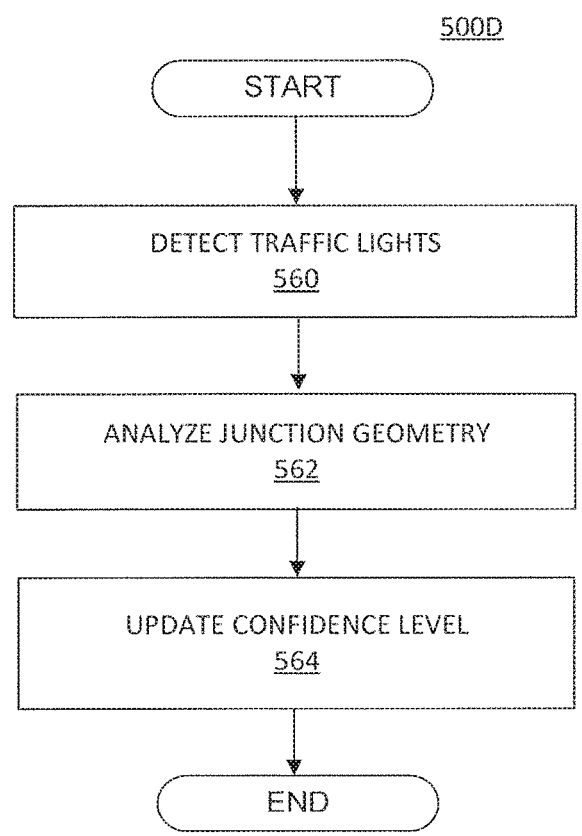
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
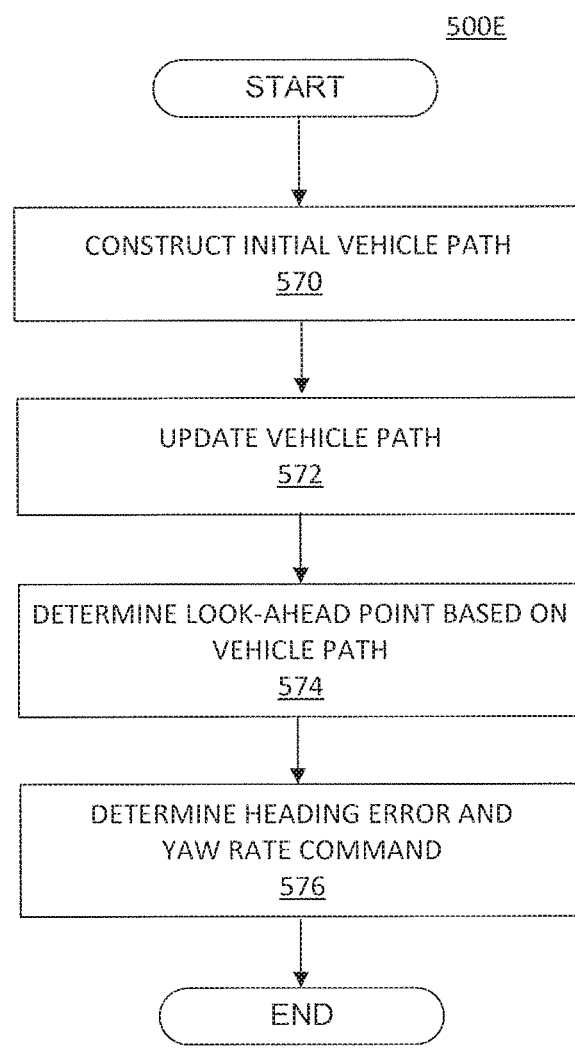
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
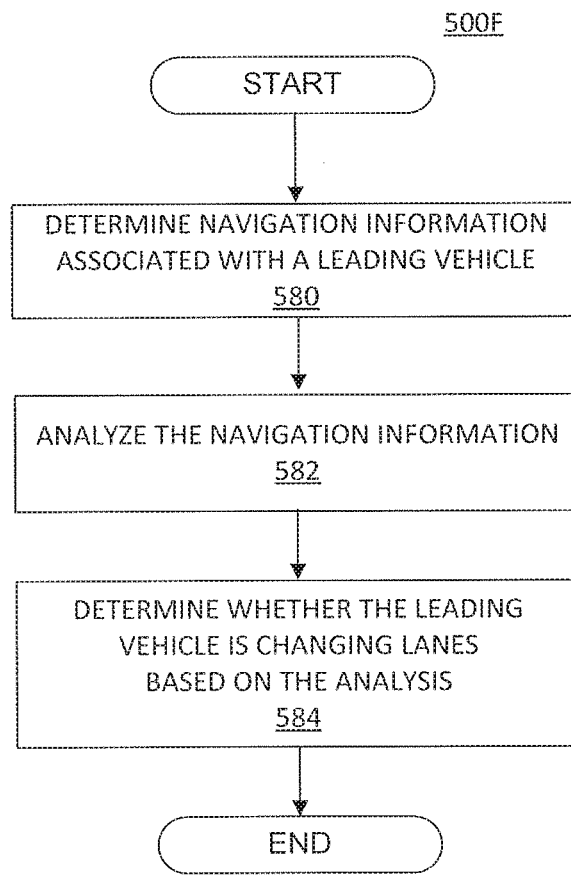
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
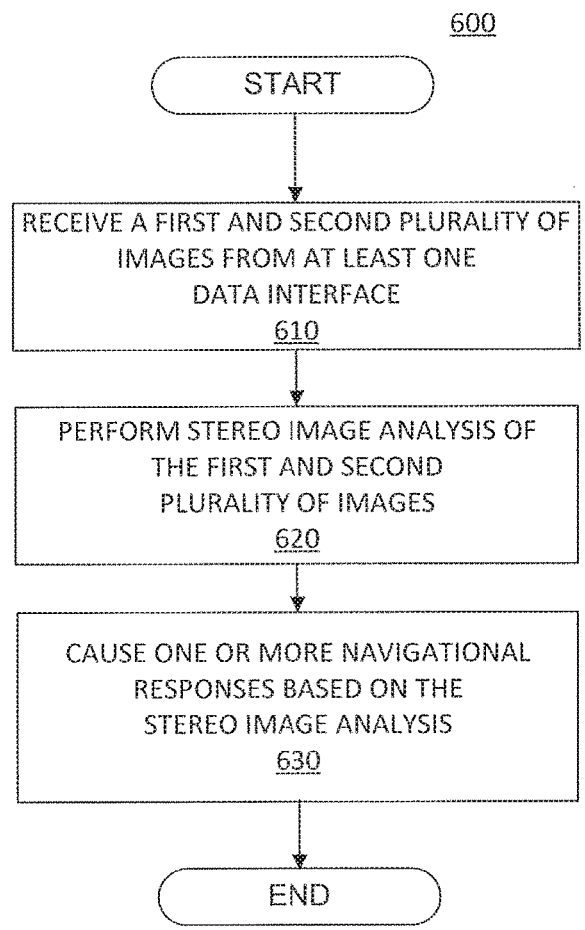
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
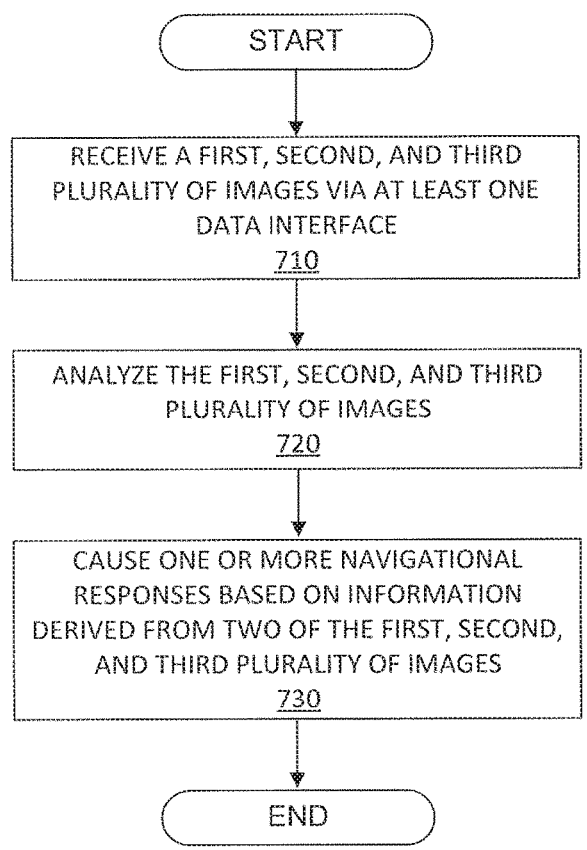
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, braking, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Radar-Cued Visual System for Vehicle Navigation

Radar systems offer the potential for detecting objects in an environment surrounding a vehicle, even in conditions where visibility may be poor. Therefore, there is an interest in including radar sensor systems on vehicles for purposes of aiding in navigation. For example, driver-assist systems, collision warning/avoidance systems, autonomous vehicles, and semi-autonomous vehicles may all benefit from the potential target object detection capabilities that radar systems offer.

While radar sensors may provide accurate ranging information, they also can exhibit certain deficiencies. First, radar sensors may generate frequent "ghost" detections, which may cause false positives in a vehicle navigation or collision avoidance system. Such unwanted ghost detections may result, for example, when objects are present in the vicinity of the vehicle, and those objects exhibit good radar reflectivity, but pose little or no threat to the vehicle. Such objects may include those with non-upright profiles or insignificant size. Manhole covers, soda cans, small debris, etc. may result in radar ghost detections. In some instances, ghost detections may occur even when no object is present.

Second, radar sensors may offer angular resolution and angular accuracy characteristics that may be unsuitable for certain vehicle applications. For example, forward collision warning systems and vehicle navigation systems (either autonomous or driver assist) may require accurate information regarding the angular location of a target object relative to the vehicle or a path of travel of the vehicle.

To enhance the reliability and usability of radar-based sensor systems, such radar systems may be deployed on a vehicle in combination with an image sensor system including one or more image acquisition devices. The radar and image systems may be used in tandem to reduce or eliminate the occurrence of ghost detections by the radar system and to accurately determine one or more of the angular position of a target object relative to the vehicle and the solid viewing angle that a target object occupies within the field of view of an image acquisition device. From a combination of range information from the radar, as well as spatial location information derived from the image system, performance of collision warning systems, driver assist systems, and other types of vehicle navigation systems may be enhanced.

Figure 8:
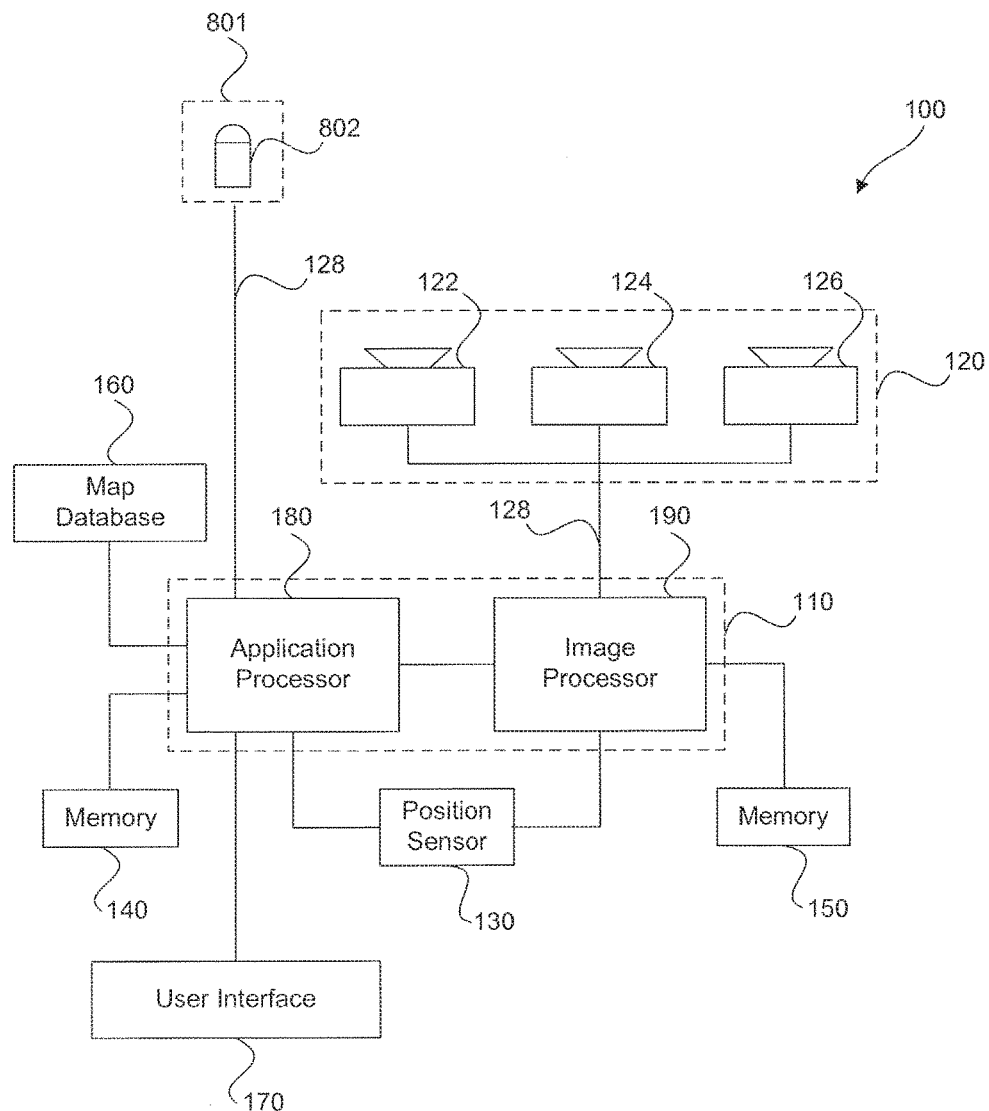
FIG. 8 is a diagrammatic representation of an exemplary system consistent with the disclosed embodiments.

FIG. 8 provides a diagrammatic representation of a system 100 along with all of the same parts and features associated with system 100 as described above relative to FIGS. 1, 2A, 2B, 2C, 2D, 2E, and others. In the embodiment shown in FIG. 8, a radar unit 801, including one or more radar sensors 802, is included in system 100. Radar unit 801 may provide an output either directly or indirectly to application processor 180 (or any other suitable logic based device) via, for example, data interface 128.

Figure 9B:
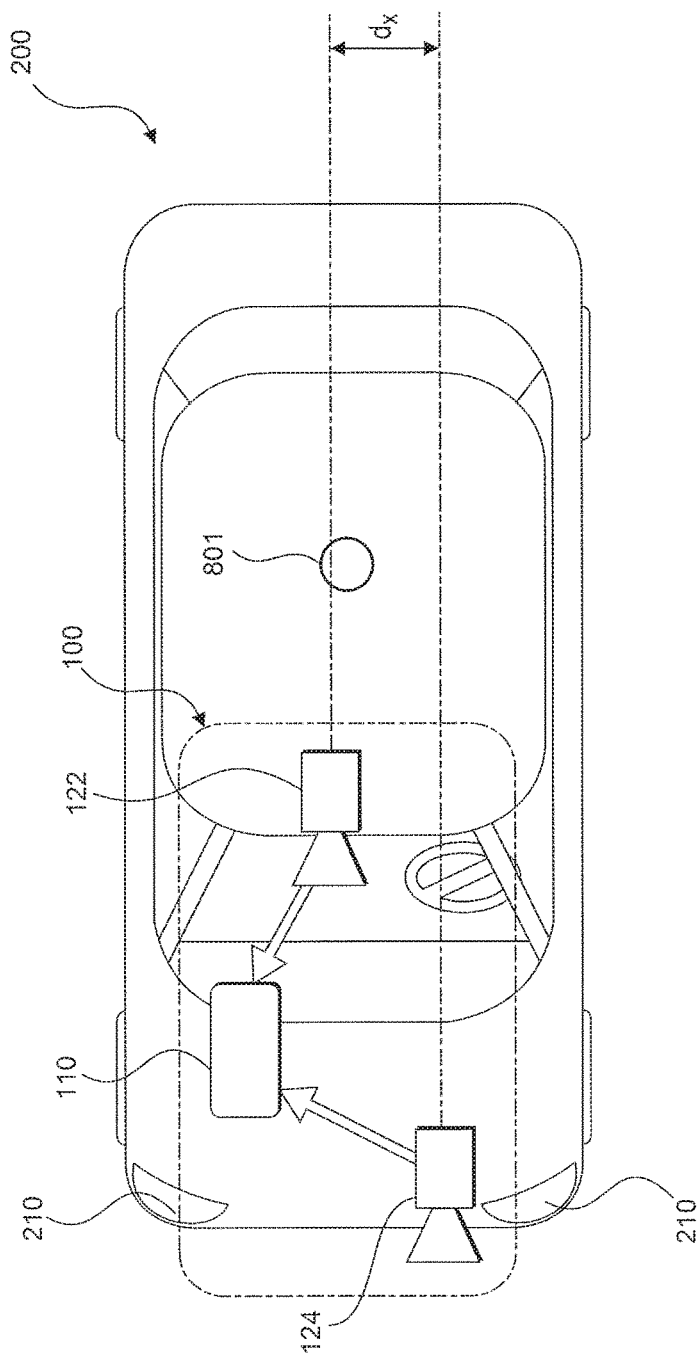
FIG. 9B is a diagrammatic top view representation of the vehicle and system shown in FIG. 9A consistent with the disclosed embodiments.
Figure 9C:
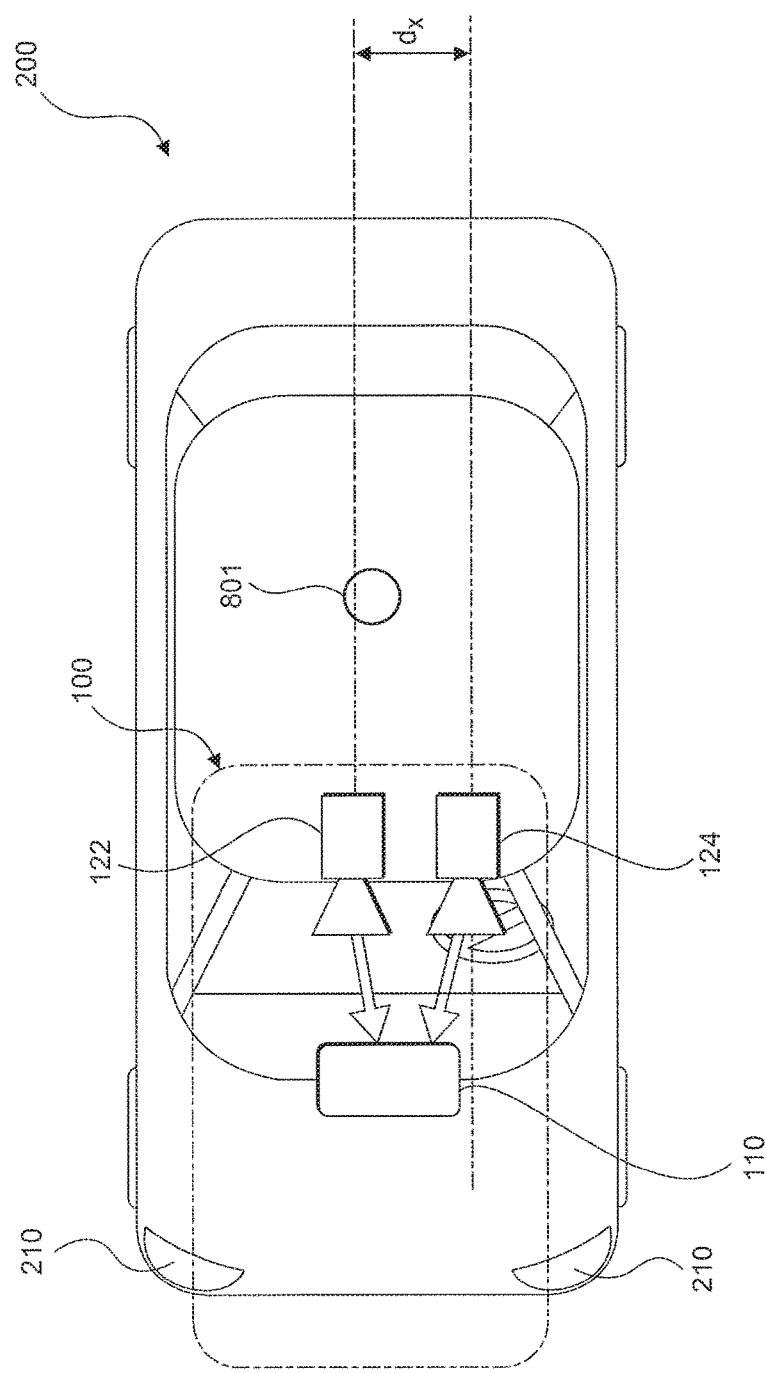
FIG. 9C is a diagrammatic top view representation of another embodiment of a vehicle including a system consistent with the disclosed embodiments.
Figure 9D:
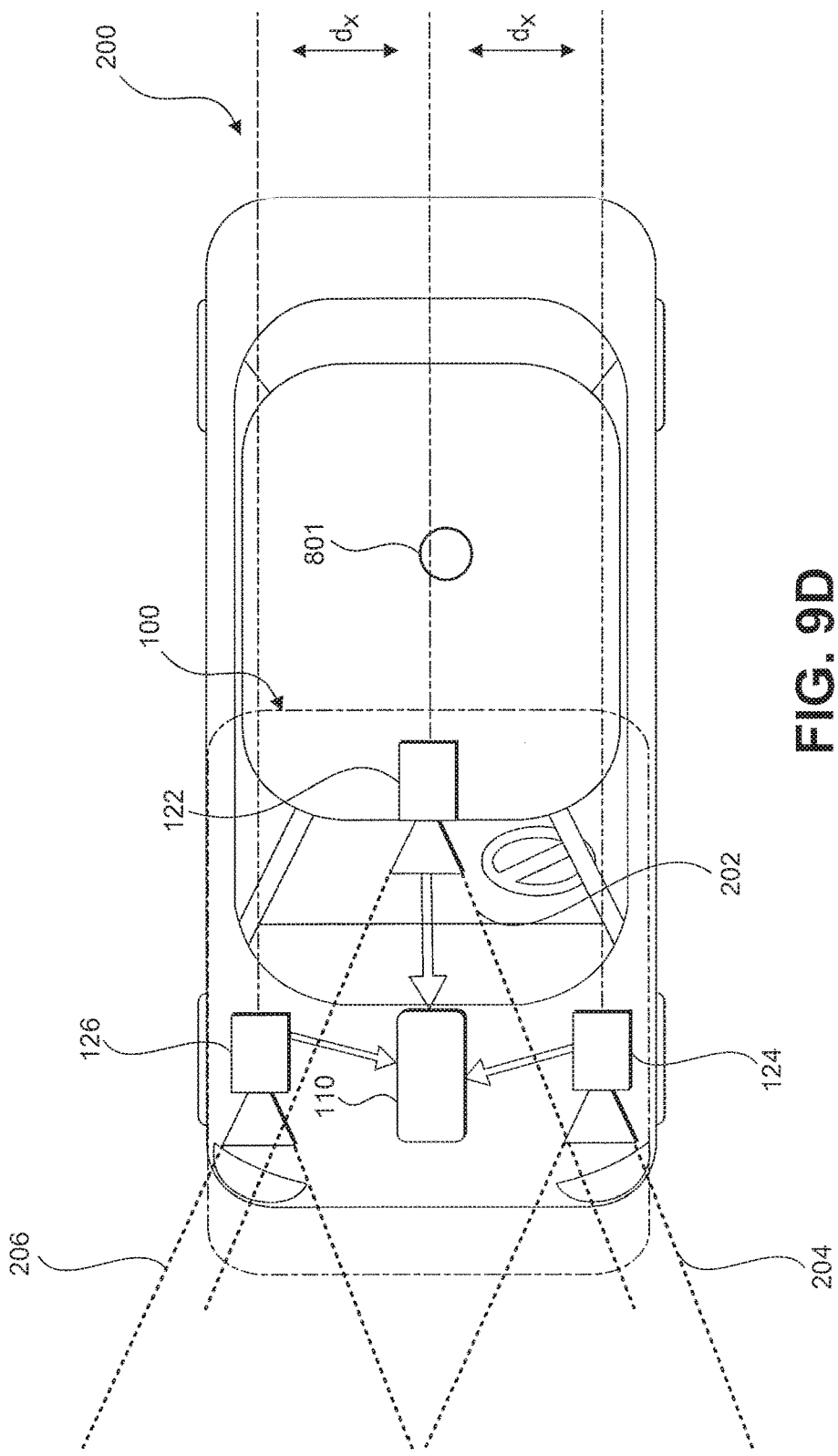
FIG. 9D is a diagrammatic top view representation of yet another embodiment of a vehicle including a system consistent with the disclosed embodiments.
Figure 9E:
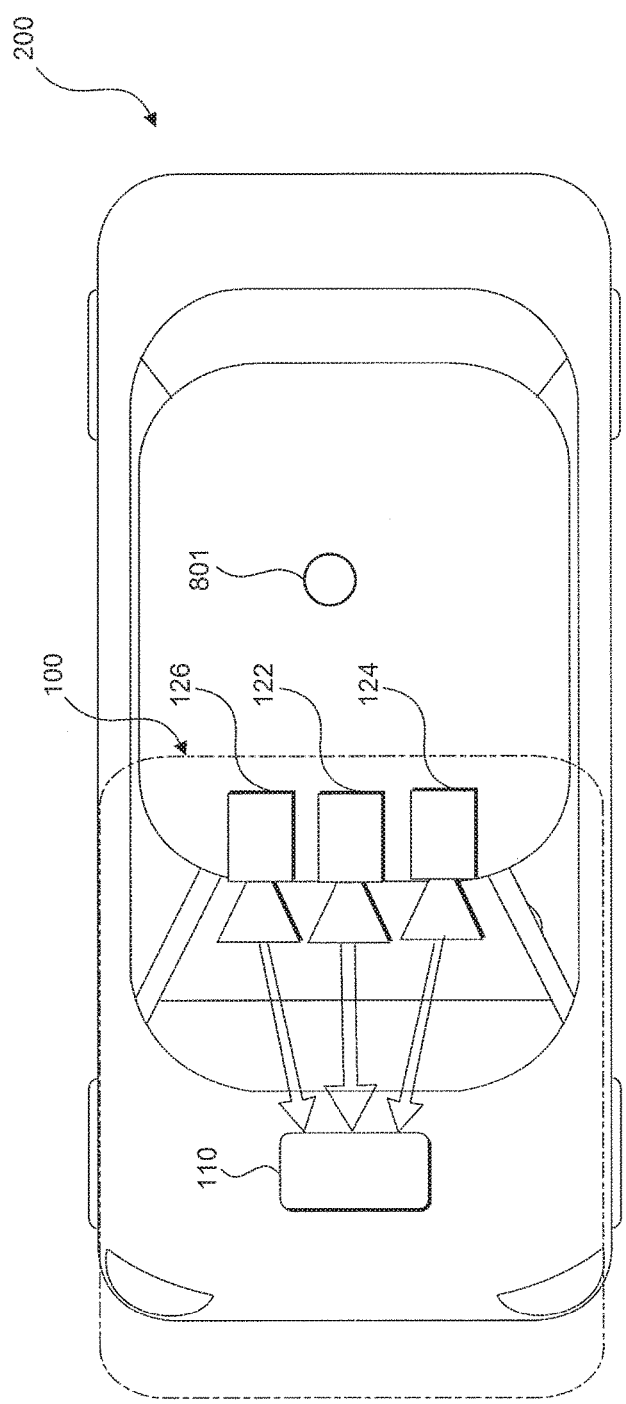
FIG. 9E is a diagrammatic top view representation of yet another embodiment of a vehicle including a system consistent with the disclosed embodiments.

In some embodiments, radar unit 801 may be combined with an image acquisition unit 120 that includes a single image capture device or multiple image capture devices. In some cases, radar unit 801 may be included on a vehicle equipped with two image capture devices (e.g., image capture device 122 and image capture device 124) as shown in FIGS. 9A, 9B, and 9C. In other embodiments, radar unit 801 may be included on a vehicle equipped with three image capture devices (e.g., image capture device 122, image capture device 124, and image capture device 126) as shown in FIGS. 8, 9D, and 9E.

Radar unit 801 may be located at any suitable location relative to vehicle 200. In some cases, as shown in FIGS. 9A-9E, radar unit 801 may be located on the roof of the vehicle. In other cases, radar unit 801 may be located in front of or behind the windshield, in the grill, in or on the forward bumper (in or on the rear bumper, in some rear facing cases), in or on a side panel (e.g., for blind spot detection), or at any other viable location on vehicle 200.

Radar unit 801 may include any suitable type of radar useful in identifying the presence of target objects in a vehicle navigation application. For example, in some embodiments, radar unit 801 may include mechanically scanning radar. In other embodiments, electronically scanning radar may be used that reduce or eliminate moving parts from radar unit 801. Any suitable frequencies or frequency ranges may be employed. For example, radar units operating at frequencies of 79 GHz, 77 GHz, 25 GHz, or 24 GHz may be used. Such units may offer various detection ranges along with various scan angles. In some embodiments, radar unit 801 may have a detection range of 100 m, 200 m, 250 m, or more and may offer scan angles of up to 360 degrees.

In the disclosed embodiments, radar unit 801 may provide information relating to one or multiple target objects in an environment of vehicle 200. Such information may include, for example, an indication of the presence of one or more target objects in the vicinity of vehicle 200 and an indication of a distance (range) to the one or more target objects. In some cases, additional information may be available from radar unit 801, such as a radar range rate (e.g., a rate that a target object is moving toward or away relative to vehicle 200). The radar range and/or radar range rate information provided from radar unit 801 may serve as an indicator of a time to contact between vehicle 200 and a target object.

During operation, radar unit 801 may provide a radar range, radar angle, and/or a radar range rate relative to a target object either directly or indirectly to application processor 180. Using this information, application processor 180 may determine a time to contact between vehicle 200 and a particular target object.

In addition to radar information, application processor 180 and/or image processor 190 may receive image data captured by one or more of image capture device 122, 124, or 126. This image data may be received in the form of a series of image frames captured at predetermined time intervals.

Using the received radar information together with the plurality of images, processing unit 110 may determine whether a particular radar detection correlates to a real world target object. If a target object is validated, processing unit 110 may identify physical attributes of the target object such as edges of the object, height of the object relative to a road surface or other surface, and angular location of the target object relative to vehicle 200.

More specifically, a process for validating and locating a target object may include the identification of a rough region of interest (ROI) in one or more of the received plurality of images from the image acquisition unit 120. For example, based on the angle and range associated with a particular radar detection, and knowing values of various parameters associated with the image acquisition device that supplied a certain image (e.g., the camera/radar calibration values, camera focal length, and height of the camera above the road), processing unit 110 may determine what region of an acquired image is likely to include a target object associated with a particular radar detection. Such a rough region of interest in the acquired image may be designated by left, right, bottom, and top boundaries of a region of the acquired image where the target object may be found.

Next, the optical flow between the rough region of interest in the acquired image and a corresponding region of a second acquired image may be determined. Conceptually, the optical flow between at least a pair of acquired images may be associated with the changing angular position of corresponding points in the images. As an example, as a vehicle travels directly toward a target object on a roadway, the target object will appear to the driver as expanding radially in all directions as the vehicle moves closer to the target object. Similarly, in images captured over time from an image captured device located in or on a vehicle, a target object captured in the images will appear to expand radially in all directions relative to images captured earlier in a sequence of images. The non-moving point directly in front of the vehicle at the center of the horizon, from which the objects in a sequence of images captured from a moving vehicle appear to emanate, is referred to as the focus of expansion.

Regarding objects in motion, if the target object is moving relative to the stationary world, the FOE will reflect the relative motion between the host vehicle and the target object. For example, if a vehicle is approaching from the right (at an intersection for example) the FOE will be to the right of the image. If the vehicle and the target object are on a collision course, the FOE will be on the target object. Because the FOE depends on the motion of the target, the FOE may be useful in isolating the target from its surroundings within one or more images of a scene.

In practice, the optical flow between two images and, more specifically, between a particular feature point within a region of interest in a first image and a corresponding feature point in a region of interest in a second image may be determined in a number of ways. As a first step, pairs of corresponding feature points from the two images may be determined. In one technique, a pair of corresponding feature points may be determined by defining a patch around a particular feature point in the region of interest of the first image (or about every pixel in the region of interest of the first image). Then, every defined patch from the first image may be compared with patches from the second image within a predetermined search area (e.g., within a predetermined or selectable range of pixels) relative to a selected patch from the first image. From every patch comparison, a correlation score may be determined based on the similarity of the compared patches. The patch from the second image that provides the highest correlation score with the patch from the first image containing the feature point of interest determines the location of that feature point in the second image.

Another technique for determining pairs of corresponding feature points from the two images involves matching or registration based on detected feature points. For example, certain feature points (e.g., corners of objects or other well-defined points in the image data) may be detected in the first image through image analysis. Similar feature points may also be detected in a second image. Patches may be defined around the detected feature points from both the first and second images. Any number of feature points may be detected within a region of interest (e.g., a region that includes 10 feature points, 20 feature points, 50 feature points, or more). A correlation score may be calculated for each patch defined for the first image by comparing each individual patch of the first image with each patch of the second image. The pair of patches (one from the first image and one from the second image) with the highest correlation score indicates the location of a particular, detected feature point in both the first and second images.

Once the locations are known for a set of feature points (or patches or other suitable image segment) in the first image and the corresponding set of feature points (or patches or any other suitable image segment) in the second image, the optical flow between the images may be determined. For example, for each corresponding pair of feature points (patches or image segments) in the pair of images, the motion that resulted in movement of the feature points from their location in the first image to their location in the second image may be determined. This motion represents the optical flow between the corresponding points of the pair of images. The optical flow inside the region of interest defined for the first image may be represented as a set of $\{(x,y,u,v)i\}$ quadruples representing image positions $(x,y)i$ and the 2D flow $(u,v)i$ measured at those positions.

If a rolling shutter is employed on one or more of the image capture devices, an observed vertical motion in the image may indicate or result from the fact that the two points were imaged at a slightly different time. If the rolling shutter scans from top to bottom an upward flow of N lines, for example, means that the time between imaging is less than a frame (by N line scan times). To get more accurate estimates of the optical flow, the flow vectors can be corrected by extending in the vector direction by frameTime/(frameTime−N*linetime).

Next, an expected optical inflation value (ds) may be determined based on information obtained from radar unit 801. For example, using the radar range to the target object, radar range rate between the target object and vehicle, and the time between captured images (dt), the expected optical inflation value in the region of interest may be represented as:

Optical inflation $(ds)=dt/TTC=dt*$(range rate)/range;

where TTC is the time to contact between the target object and the vehicle.

Using the expected optical inflation value and the determined optical flow information, the target object may be isolated within the region of interest. For example, using as input the set of $\{(x,y,u,v)i\}$ quadruples along with the optical inflation (ds) expectation, a consensus set of pixels $\{(x,y)\}$ may be determined where the optical flow substantially matches the expected optical inflation. This consensus set of pixels (image segments, points, or other portions of the region of interest in the plurality of images) may represent a target object region in the plurality of images occupied by the target object. The points, pixels, image segments, etc. associated with this target object region may share a common focus of expansion, as opposed to other image areas within the region of interest that do not correspond to the target object. For those other image areas (e.g., image portions associated with the road or background objects), the determined optical flow for those areas will likely not match the expected optical inflation determined based on the target object range and range rate, because the background objects and road (aside from the portion of the road located at the same range as the target object) will have ranges different from the target object.

Regarding the focus of expansion (FOE) and its relationship to the TTC or time to contact, all stationary points in a captured image will share the same true FOE, which corresponds to the direction that vehicle 200 is traveling. For an upright object, if a TTC to that object is available (e.g., based on the output of radar unit 801), the estimated FOE for every point in the object's image may be derived based on the optical flow (i.e., the points' motion in the image). If the TTC for every point in an image was available, and every point in the image could be tracked from frame to frame, then the same FOE may be derived for all points in the image. In practice, however, a TTC may be available only for a single radar-detected object or a group of radar-detected objects and not for every point associated with a particular image. Deriving the FOE based on the TTC value for a single detected object may yield the same FOE for all imaged points associated with that object (assuming the TTC is valid for all points of the object). On the other hand, using the TTC associated with a target object to derive and FOE associated with a background object or a foreground object at a range different from the detected target object may result in an FOE different from the one derived for the target object. These differences in derived FOE values may be used to isolate a target object within an image to both confirm that a radar detection corresponds to an actual object and to determine the size, shape, and spatial orientation of the target object relative to vehicle 200.

Examining the process for isolating the target object in the image frames in further detail, when approaching an upright target object in a roadway, the optical flow of a pixel/patch in the image can be described using a model as a function of the position in the image, TTC, and the FOE. The radar may detect an object that moves from distance $Z_1$ in frame 1 to distance $Z_2$ in frame 2. A feature on the target object having coordinates $(x_1, y_1)$ may be detected in frame 1 and tracked to coordinates $(x_2, y_2)$ in frame 2. The point may be assumed as lying at a constant lateral distance X from the optical axis and at a constant height Y above the road. Using a pinhole camera model, the motion $(\Delta x, \Delta y)$ of the feature point in the image may be given by:

$$x_1 = x_0 + X \cdot f/Z_1, y_1 = y_0 - (cH - Y) \cdot f/Z_1$$

$$x_2 = x_0 + X \cdot f/Z_2, y_2 = y_0 - (cH - Y) \cdot f/Z_2$$

$$\Rightarrow \Delta x = x_2 - x_1 = X \cdot f \cdot (1/Z_2 - 1/Z_1) = (x_1 - x_0) \cdot Z_1 \cdot (1/Z_2 - 1/Z_1)$$
$$= (x_1 - x_0) \cdot (Z_1 - Z_2)/Z_2$$

$$\Rightarrow \Delta y = y_2 - y_1 = -(cH - Y) \cdot f \cdot (1/Z_2 - 1/Z_1) = (y_1 - y_0) \cdot Z_1 \cdot (1/Z_2 - 1/Z_1) = (y_1 - y_0) \cdot (Z_1 - Z_2)/Z_2$$

where the camera's focal length is given by f and its height by cH. The FOE is unknown and given by $(x_0, y_0)$.

The motion equations can therefore be parametrized as follows:

$$\Delta x = S \cdot (x - x_0)$$

$$\Delta y = S \cdot (y - y_0)$$

where the scale $S = (Z_1 - Z_2)/Z_2$ describes the expansion in the image of the object relative to the FOE. The time to contact (TTC) with the object, assuming that the relative speed between the target object and the vehicle remains constant, can be derived from the scale S as follows:

$$S = -\Delta Z/Z$$

$$\Rightarrow TTC = -Z/V_{rel} = -Z \cdot \Delta t/\Delta Z = \Delta t/S$$

In practice, the consensus set of feature points may be described by the largest union of points whose observed motion can be described by a certain fixed FOE, given the TTC obtained from the radar target. The size of this consensus set will define the probability that there is an actual upright object with a TTC as obtained from the radar target within the region of interest as defined by the radar target.

Any suitable approach may be used for detecting the set of pixels in the image that correspond to the expected TTC, as obtained from the radar target. In one embodiment, an optimization technique may be used, such that given a set of N feature points $\{(x_i, y_i)\}_{i=1}^{N}$, observed motions $\{(\Delta x_i, \Delta y_i)\}_{i=1}^{N}$ and radar scale (minus the range divided by the range-rate), we can derive the estimated FOE $(\hat{x}_0, \hat{y}_0)$ that best describes the observed motion (i.e. the model that predicts motions $(\widehat{\Delta x_i}, \widehat{\Delta y_i})$ that are optimal in a sense that they are 'closest' to the observed motions). The number of points whose observed motion vectors are sufficiently close (euclidian distance measure) to the expected motion vectors, will define the consensus set.

In another embodiment, a Hough transform approach may be used. In this approach, for each tracked point i, the FOE $\{x_0(S, \Delta x_i, x_i), y_0(S, \Delta y_i, y_i)\}$ may be derived as a function of the point's position, measured translation in the image, and the expected TTC or scale. A two-dimensional histogram (Hough transformation) may be constructed by discretizing the obtained FOE. Then, the value in the histogram that obtained the highest number of votes may be determined in order to define the consensus set of points that contributed to that value.

As an output of the target identification process based on the radar information together with the visual image information, a target object region may be identified in the images. This target object region may be delineated by an image bounding box (or other shape) encompassing the consensus set $\{(x,y)\}$ of pixels that comply with the expected optical inflation and share a common FOE in agreement with a TTC determined based on the detected radar information. Using this target object region, the edges of a physical target object may be identified and located relative to vehicle 200. Further, the height, shape, width or any other dimensional characteristics of the target object may be determined. Combining the target object region in an acquired image with known parameters of the image acquisition device (e.g., the focal length, height above the road, orientation relative to vehicle 200, etc.) may enable determination of the angular orientation of the target object relative to vehicle 200.

Such information may be helpful in determining whether the target object resides in a path of vehicle 200. For example, if based on the location in a certain image of the target object region, processing unit 110 determines that the target object falls within a travel path of vehicle 200, processing unit 200 may cause any of a number of system responses. In some embodiments the system response may include a navigation response, such as braking, changing steering direction, etc. If processing unit 110 determines that allowing vehicle 200 to continue along the current travel direction may result in a collision with the target object, then processing unit may warn a driver of vehicle 200, automatically change a steering direction, automatically apply the vehicle's brakes, etc. For example, processing unit 110 may provide a notice to the driver of the vehicle (e.g., an audible sound or visual indicator via user interface 170) and/or provide control signals to one or more of throttling system 220, braking system 230, and steering system 240 to navigate vehicle 200. In some embodiments, processing unit 110 may continue to analyze images and/or radar output to determine whether the system response should be interrupted (e.g., if the object has moved out of the path of vehicle 200, discontinue applying the brakes).

Figure 10:
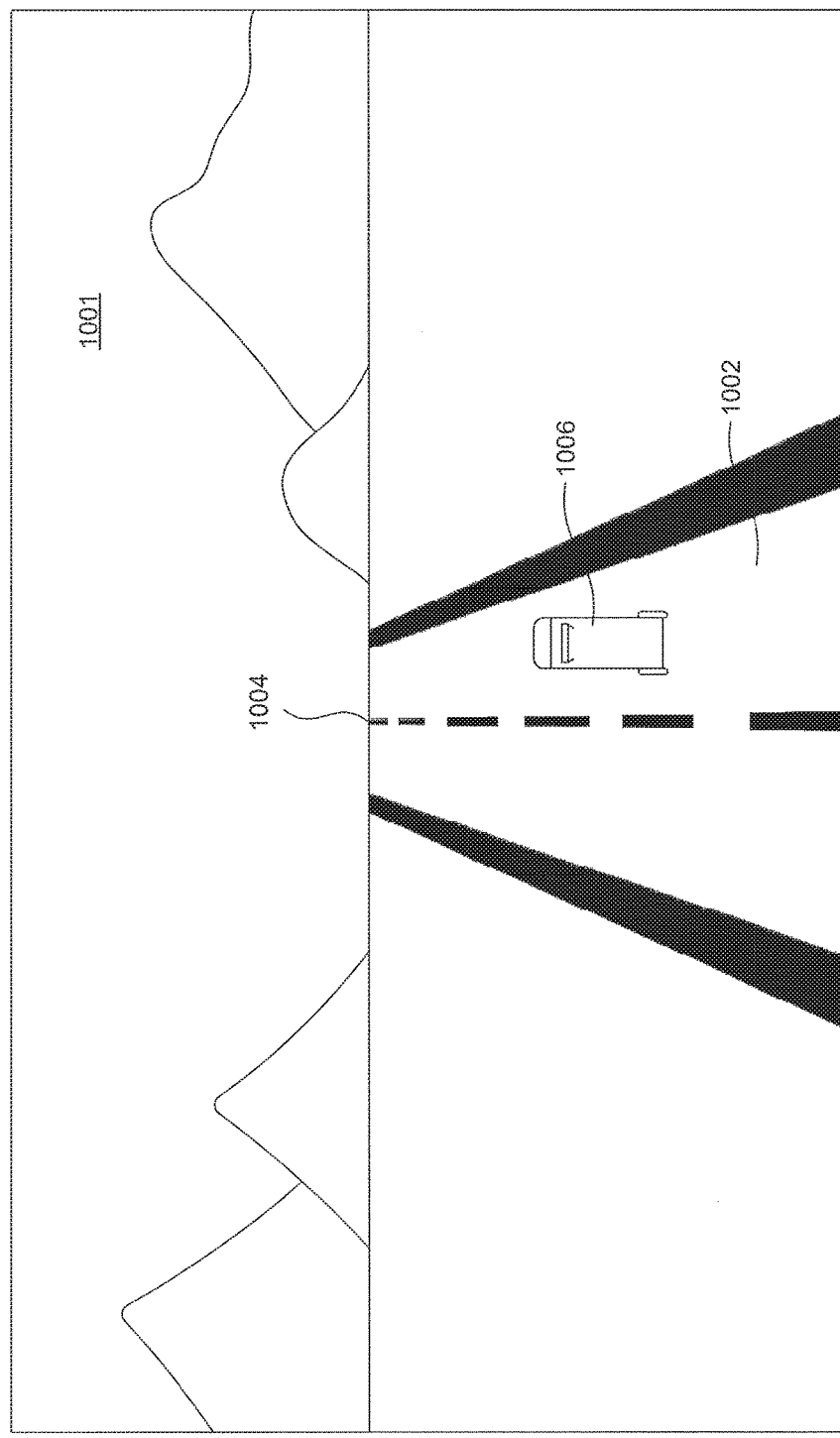
FIG. 10 is a diagrammatic representation of an environment in which a vehicle may travel.

FIGS. 10 through 13 represent various phases of the process for identifying a target object region within one or more images. For example, FIG. 10 depicts a scene 1001 including a road 1002 on which vehicle 200 is traveling. FIG. 10 may represent scene 1001 from, for example, a forward facing perspective of vehicle 200. Consistent with the discussion above, the true FOE for scene 1001 as vehicle 200 travels along road 1002 will appear to be located at point 1004. Positioned in one of the lanes of road 1002 is an upright hazard in the form of a trash can 1006. As vehicle 200 approaches trash can 1006, radar unit 801 may acquire range and range rate information relative to vehicle 200 and trash can 1006. From this information, a TTC between vehicle 200 and trash can 1006 may be determined.

Figure 11A:
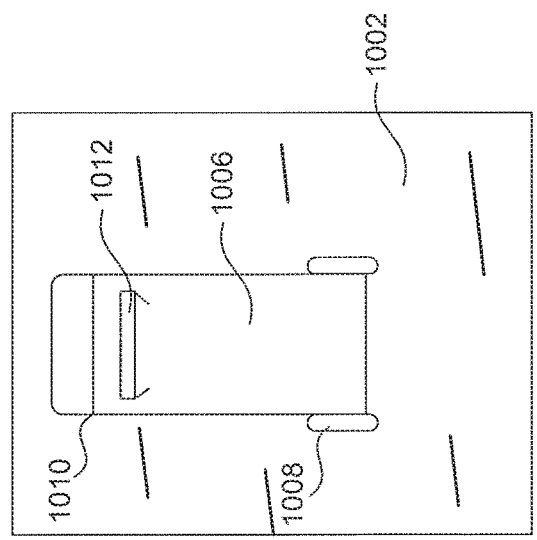
FIG. 11A represents an image of an object within an environment of the vehicle.
Figure 11B:
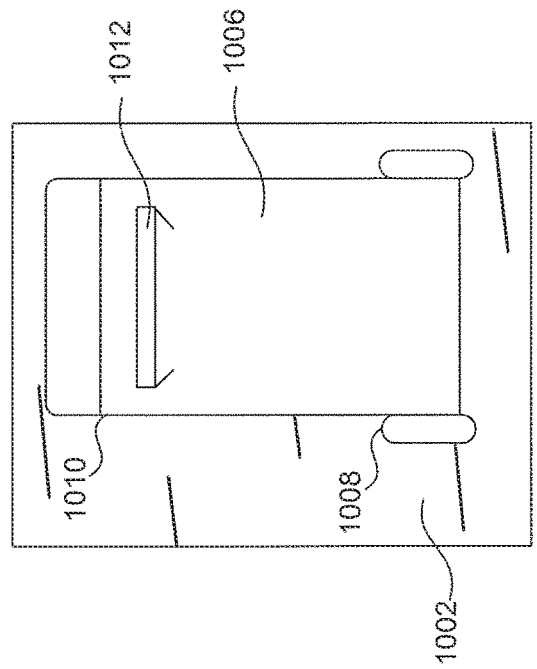
FIG. 11B represents another image of the object within an environment of the vehicle, from which optical flow may be determined relative to the image of FIG. 11A.

As vehicle 200 approaches trash can 1006, images of the scene, including trash can 1006, may be acquired by one or more of image acquisition devices 122, 124, and/or 126. As noted above, the radar information may also be used to identify regions of interest within captured images where the detected target object may be located. FIGS. 11A and 11B show representative regions of interest from each of a pair of acquired images, as determined based on the information associated with detection by the radar unit 801 of trash can 1006. As vehicle 200 travels along the center of road 1002, a series of images may be captured showing trash can 1006. Due to the motion of vehicle along road 1002 in the direct of FOE 1004, images of trash can 1006 captured later in the sequence will show trash can 1006 expanding within the image frame as well as moving down and to the right within the image frame (as represented by FIGS. 11A and 11B).

The optical flow from the image region shown in FIG. 11A to the image region in FIG. 11B may be determined. For example, based on any of the methods discussed above, the motion of any of selected target or reference points 1008, 1010, and 1012 (or any other number of target or reference points) on trash may 1006 may be determined from the frame shown in FIG. 11A to the frame shown in FIG. 11B. In some cases, the target or reference points may coincide with features in the image distinguishable from the immediate surroundings (e.g., a corner of an object, small dark or light areas of an object, a light source, a handle, bump, etc.). Such target or reference points may be readily identified in subsequent images and may provide a high level of confidence that the identified reference point in one or more subsequent images corresponds with the reference point chosen from the original image. The determined motion constitutes the measured optical flow, which is a 2D vector, (u, v).

Figure 12B:
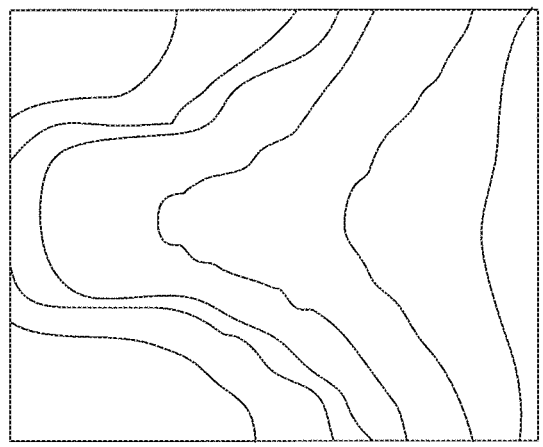
FIG. 12B represents a vertical optical flow map relative to the object of FIG. 1A.
Figure 12A:
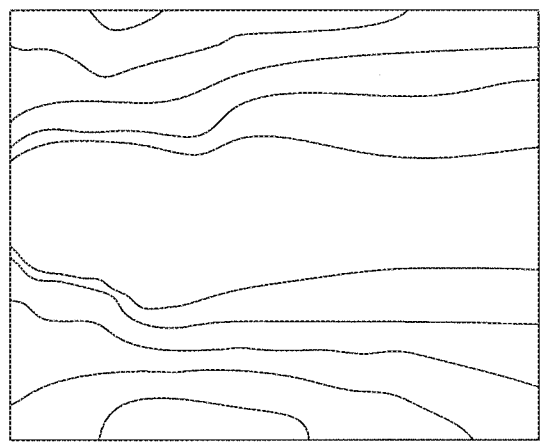
FIG. 12A represents a horizontal optical flow map relative to the object of FIG. 11A.

FIG. 12A provides a diagrammatic representation of plotted values of the horizontal optical flow between FIGS. 11A and 11B. Similarly, FIG. 12B provides a diagrammatic representation of plotted values of the vertical optical flow between FIGS. 11A and 11B. Using the radar range and radar range rate information, an expected optical inflation magnitude may be determined as a scale factor. And, given the scale from the radar, all pixels, points, image segments, patches, etc. that share a common FOE may be determined. The optical flow determination is separable, meaning that it can be determined or solved separately for the measured vertical flow and the measured horizontal flow. Thus, for a given radar-determined scale and vertical flow, for example, associated with vertical position (y) in the image of FIG. 12B, the following expression may be used:

$$FOE \cdot y = y - V/(scale-1),$$

where V is vertical flow and the scale is the optical inflation magnitude derived from the radar range and range rate values.

Figure 13:
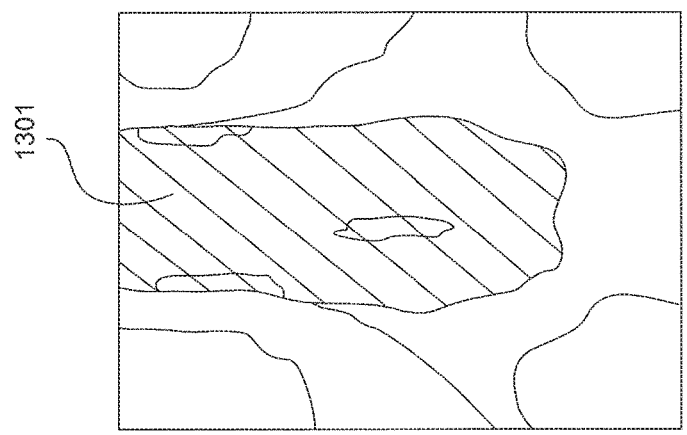
FIG. 13 represents a target object region derived from optical flow information and radar range information according to exemplary disclosed embodiments.

Thus, applying this expression to the vertical flow data represented by FIG. 12B and scaling by the radar-determined scaling factor, a plot similar to the one shown in FIG. 13 may be obtained. FIG. 13 includes a target object region 1301 coinciding with points in the image that, for the measured radar range and radar rate values, share a common FOE. Target object region 1301 coincides with trash can 1006 and may be used to confirm the presence of an actual target object as well as locate the trash can spatially relative to vehicle 200 (using not only the radar range and radar rate measurements, but also known characteristics associated with the image acquisition device(s) that captured the images of trash can 1006. As a result, edge locations, size and shape characteristics, etc. may all be determined for trash can 1006, and if trash can 1006 resides in the path of vehicle 200, system 100 may provide a warning to a driver of vehicle 200 or cause one or more navigational changes to occur.

The presently described embodiments may operate in a stand-alone capacity in a navigational system for a vehicle. In some embodiments, though, the radar-cued navigational system may be integrated with or operated in conjunction with one or more other navigational systems for a vehicle. For example, in some cases the radar-cued visual navigation system may operate with or be integrated with an advanced driver assist system (ADAS) and may be used to provide at least some functionality to the ADAS system. Navigational assist modules for traffic sign recognition (TSR), lane departure warning (LDW), intelligent headlight control (IHC), and/or traffic light detection may all benefit from radar-cued output. For example, in some embodiments, as vehicle 200 approaches an intersection, the optical flow of identified light sources present in two or more images may be observed. The optical flow of such light sources may be compared to time to contact (TTC) values available from radar unit 801 for stationary objects in the surrounding environment of vehicle 200 (such TTC values may be determined, for example, based on radar range rate and vehicle speed). Where a TTC value for a stationary object agrees with the optical flow observed for a light source in the acquired images, application processor 180, e.g., may determine that the light source is a traffic light or is a potential traffic light. If the light source is determined to be a traffic light, the system may further determine the color associated with the light source. If the light source is red or yellow, then a warning may be issued for the driver to slow to a stop. Alternatively, the system could automatically apply the brakes and slow the vehicle to a stop. If the light source is green, then no navigational change may be deemed necessary.

The presently disclosed system may also operate according to different modes. For example, in some situations there may be benefits from operating the navigational system in a wide detect mode. For example, in an urban environment where vehicle speeds may be reduced, but the number of potential target objects surrounding vehicle 200, such as pedestrians, lights, intersections, trash cans, etc., may be higher, the system may select a wide mode of operation. In other environments, such as a rural road, for example, where speeds may be higher than in a city, and the number of potential target objects may be fewer, the navigational system may select a narrow mode of operation. In some embodiments, the wide mode of operation may be associated with analysis of images from an image capture device having a wider field of view than another available image capture device having a narrower field of view. The navigational system may select a certain camera (or lens where lenses are selectable or adjustable) for image capture or image analysis based on any suitable factor. For example, applications processor may select image acquisition device 122 for image capture or for image stream analysis in certain situations and may select image acquisition device 124 or 126 in other situations. In some embodiments, a camera, lens, or image stream may be selected based on radar range or range rate information obtained from radar unit 801, based on vehicle speed, based on a recognized environment or target object density derived from the captured images and/or radar information, or using any other suitable parameter.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/ AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A navigation system for a vehicle, the system comprising:
    at least one image capture device configured to acquire a plurality of images of an environment;
    a radar sensor to detect an object in the environment; and
    at least one processing device programmed to:
        receive the plurality of images from the at least one image capture device;
        receive output from the radar sensor;
        determine, from the plurality of images, an indicator of optical flow;
        determine a value indicative of an expected optical inflation associated with the object in the plurality of images;
        determine from the plurality of images where the value indicative of an expected optical inflation associated with the object substantially matches the indicator of optical flow;
        identify a target object region; and
        cause a system response based on the identified target object region.

2. The navigation system of claim 1, wherein the target object region is associated with a common focus of expansion.

3. The navigation system of claim 1, wherein the at least one processing device is further programmed to determine an angular position of the object relative to the vehicle based on a determined location of the target object region.

4. The navigation system of claim 1, wherein the at least one processing device is further programmed to determine a location of the object relative to the vehicle based on the identified target object region.

5. The navigation system of claim 1, wherein the system response includes at least one of braking or a change in current travel direction of the vehicle if the at least one processing device determines that the current travel direction may result in a collision with the object.

6. The navigation system of claim 1, wherein the system response is a navigational response including braking.

7. The navigation system of claim 1, wherein the system response is a navigational response including a change in a direction of travel of the vehicle.

8. The navigation system of claim 1, wherein the at least one processing device is further programmed to identify edges of the object based on the identified target object region.

9. The navigation system of claim 1, wherein the at least one processing device is further programmed to determine a height of the object based on the identified target object region.

10. The navigation system of claim 1, wherein the output of the radar sensor includes an indicator of a time to contact between the vehicle and the object.

11. The navigation system of claim 1, wherein the at least one processing device is configured to account for at least one effect caused by use of a rolling shutter to acquire the plurality of images in determining the indicator of optical flow.

12. The navigation system of claim 1, wherein the at least one processing device is configured to select an operational mode from among at least a first mode and a second mode, where the first mode is associated with a wider image capture field of view than the second mode.

13. A vehicle comprising a navigation system, the navigation system comprising:
    at least one image capture device configured to acquire a plurality of images of an environment;
    a radar sensor to detect an object in the environment; and
    at least one processing device programmed to:
        receive the plurality of images from the at least one image capture device;
        receive output from the radar sensor;
        determine, from the plurality of images, an indicator of optical flow;
        determine a value indicative of an expected optical inflation associated with the object in the plurality of images;
        determine from the plurality of images where the value indicative of an expected optical inflation associated with the object substantially matches the indicator of optical flow;
        identify a target object region; and
        cause a system response based on the identified target object region.

14. The vehicle of claim 13, wherein the at least one processing device is further programmed to determine an angular position of the object relative to the vehicle based on a determined location of the target object region.

15. The vehicle of claim 13, wherein the at least one processing device is further programmed to determine a location of the object relative to the vehicle based on the identified target object region.

16. The vehicle of claim 13, wherein the system response includes at least one of braking or a change in current travel direction of the vehicle if the at least one processing device determines that the current travel direction may result in a collision with the object.

17. The vehicle of claim 13, wherein the at least one processing device is further programmed to identify edges of the object based on the identified target object region.

18. The vehicle of claim 13, wherein the at least one processing device is further programmed to determine a height of the object based on the identified target object region.

19. The vehicle of claim 13, wherein the output of the radar sensor includes an indicator of a time to contact between the vehicle and the object.

20. The vehicle of claim 13, wherein the processing device is further configured to identify a light source in at least one of the plurality of images, determine whether the light source is a traffic light based on the indicator of optical flow and the output of the radar sensor, and cause automatic application of brakes of the vehicle if the traffic light is determined to be yellow or red.

21. The navigation system of claim 1, wherein the radar sensor is configured to provide an output including range information indicative of at least one of a range or range rate between the vehicle and the object.

22. The navigation system of claim 21, wherein the expected optical inflation is determined based at least upon the range information from the output of the radar sensor.

23. The navigation system of claim 1, wherein the at least one processing device is further programmed to determine, for each of a plurality of image segments in a first image, from among the plurality of images, and corresponding image segments in a second image, from among the plurality of images, the indicator of optical flow.

24. The navigation system of claim 23, wherein the identified target object region includes at least a subset of the determined one or more areas of the second image.

25. The vehicle of claim 13, wherein the radar sensor is configured to provide an output including range information indicative of at least one of a range or range rate between the vehicle and the object.

26. The vehicle of claim 25, wherein the expected optical inflation is determined based at least upon the range information from the output of the radar sensor.

27. The vehicle of claim 17, wherein the at least one processing device is further programmed to determine, for each of a plurality of image segments in a first image, from among the plurality of images, and corresponding image segments in a second image, from among the plurality of images, the indicator of optical flow.

28. The vehicle of claim 27, wherein the identified target object region includes at least a subset of the determined one or more areas of the second image.

* * * * *